US010165157B2

(12) United States Patent
Carr et al.

(10) Patent No.: US 10,165,157 B2
(45) Date of Patent: Dec. 25, 2018

(54) METHOD AND DEVICE FOR HYBRID ROBOTIC/VIRTUAL PAN-TILT-ZOOM CAMERAS FOR AUTONOMOUS EVENT RECORDING

(71) Applicant: Disney Enterprises, Inc., Burbank, CA (US)

(72) Inventors: G. Peter K. Carr, Burbank, CA (US); Michael Peter K. Mistry, Burbank, CA (US); Iain Matthews, Burbank, CA (US); Yaser Sheikh, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 641 days.

(21) Appl. No.: 14/042,265

(22) Filed: Sep. 30, 2013

(65) Prior Publication Data

US 2014/0232818 A1 Aug. 21, 2014

Related U.S. Application Data

(60) Provisional application No. 61/766,438, filed on Feb. 19, 2013.

(51) Int. Cl.
*H04N 5/232* (2006.01)
*H04N 5/222* (2006.01)
*H04N 5/247* (2006.01)

(52) U.S. Cl.
CPC .......... *H04N 5/222* (2013.01); *H04N 5/2224* (2013.01); *H04N 5/247* (2013.01)

(58) Field of Classification Search
None
See application file for complete search history.

(56) References Cited

U.S. PATENT DOCUMENTS

| 6,731,284 B1 * | 5/2004 | Oxaal | G06T 3/0062 345/427 |
| 8,358,317 B2 * | 1/2013 | Carlson | G06T 15/04 345/15 |
| 8,917,317 B1 * | 12/2014 | Beeler | G01B 11/2504 348/47 |
| 9,210,312 B2 * | 12/2015 | Sablak | H04N 7/183 |
| 2004/0100563 A1 * | 5/2004 | Sablak | H04N 5/77 348/211.4 |

(Continued)

OTHER PUBLICATIONS

Zhang et al. "*An Automated End-to End Lecture Capture and Broadcasting System*", ACM Journal Name, vol. V, No. N, Sep. 2006,25 pages.

Primary Examiner — Edemio Navas, Jr.
(74) Attorney, Agent, or Firm — Fay Kaplun & Marcin, LLP

(57) ABSTRACT

A system and method generates a broadcast image. The method includes receiving a first image captured by a first camera having a first configuration incorporating a first center of projection. The method includes determining a first mapping from a first image plane of the first camera onto a sphere. The method includes determining a second mapping from the sphere to a second image plane of a second virtual camera having a second configuration incorporating the first center of projection of the first configuration. The method includes generating a second image based upon the first image and a concatenation of the first and second mappings.

20 Claims, 14 Drawing Sheets

(56) References Cited

U.S. PATENT DOCUMENTS

| | | | | |
|---|---|---|---|---|
| 2008/0097155 A1* | 4/2008 | Gattani | .............. | A61B 1/00039 |
| | | | | 600/117 |
| 2009/0207250 A1* | 8/2009 | Bennett | ................ | F16M 11/105 |
| | | | | 348/144 |
| 2009/0315978 A1* | 12/2009 | Wurmlin | .................. | G06T 5/005 |
| | | | | 348/43 |
| 2010/0001997 A1* | 1/2010 | Kajikawa | ................. | G06T 15/20 |
| | | | | 345/419 |
| 2012/0195583 A1* | 8/2012 | Pace | ...................... | G03B 35/08 |
| | | | | 396/326 |
| 2012/0328152 A1* | 12/2012 | Bamba | .................. | G06T 3/0062 |
| | | | | 382/103 |

\* cited by examiner

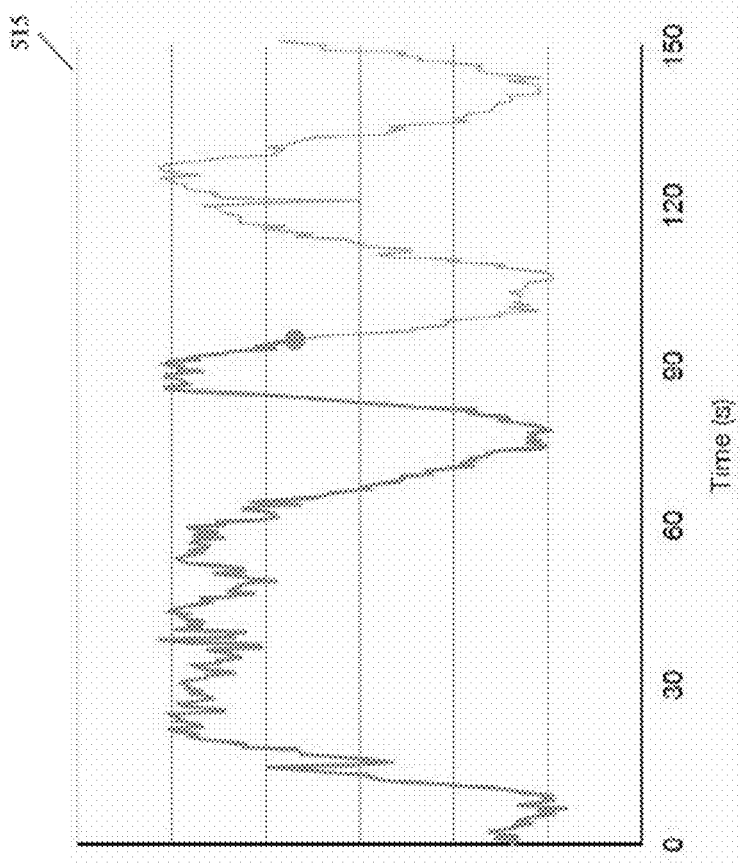
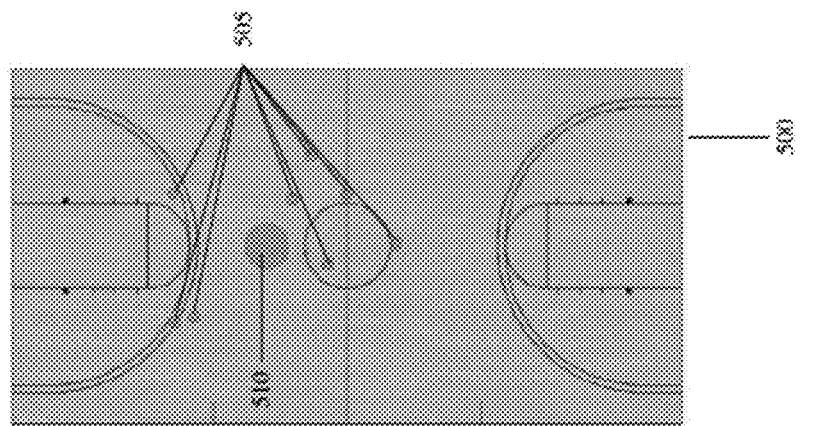
Fig. 5B
Fig. 5A

METHOD AND DEVICE FOR HYBRID ROBOTIC/VIRTUAL PAN-TILT-ZOOM CAMERAS FOR AUTONOMOUS EVENT RECORDING

RELATED APPLICATION

The present application claims priority to U.S. Provisional Appln. Ser. No. 61/766,438 entitled "Spherical Resampling for Video Generation" filed on Feb. 19, 2013, the entirety of which is incorporated by reference herein.

BACKGROUND INFORMATION

A live broadcast such as one shown on television includes at least one video camera that is directed toward a scene. Conventional systems provide for a camera operator to manually operate the camera. Accordingly, the field of view of the camera is determined by the camera operator based upon the discretion of the camera operator. However, there are ways of improving a selection of the field of view of the camera in an automated manner. A robotic camera may be used to record live events autonomously with the potential to streamline and improve current broadcasting models. For example, an optimal shooting location may be impractical for manual human operation. Hiring a professional camera operator increases costs and may not justify the benefit of an additional perspective. In these instances, conventional methods to improve or automate the control of the robotic camera is extremely beneficial. Automatically planning where the camera should look is a key challenge especially when the source information is noisy sensor data. In practice, the camera must be controlled to ensure that it actually looks at the intended target. Although path planning and camera control are separate tasks, the two are highly correlated. That is, it is futile to plan a motion path that the camera is physically unable to follow.

When automated systems are used to control the manner in which the camera operates, the camera should move smoothly and purposefully to avoid disorienting the viewer. A simple solution for this is to place a setting in a controller for the automated system to limit changes in acceleration of the camera. However, such an approach neglects how well the camera continues to follow the area of interest or whether it oscillates around a target fixation point. Accordingly, the conventional systems do not provide for the autonomous camera to plan a trajectory which balances smooth motion against tracking error. That is, the conventional system for automating camera control does not provide planning for anticipating object motion such that the conventional system is able to predict the manner in which the camera is to react or move.

In order to anticipate object motion, an online, realtime system may be used, particularly when an event is being broadcast live. Specifically, sensor data is generated and processed in realtime such that a robotic pan-tilt-zoom (PTZ) camera follows the subject of interest and captures high-resolution images using all pixels from its image sensor. However, to capture aesthetic video, the online, realtime system must also be able to anticipate future object locations so that an optimally smooth trajectory may be planned. With regard to an event having high dynamic motion associated with subjects of interest, online autonomous robotic camera systems may be inadequate as they are more practical in environments with limited dynamic motion such as lecture halls and video conference facilities.

An event such as one involving team sports has highly dynamic object motions. Specifically, an object of the sport (e.g., ball) and the players are continuously moving. Since the conventional online realtime system does not provide the necessary system requirements for such a highly dynamic event, conventional systems utilize non-realtime offline resampling approaches. In the resampling framework, one or more high-definition stationary cameras initially capture the live action. Subsequently, video from a virtual camera is synthesized after the fact by resampling the pixels from the fixed cameras. For example, the resampling may be a simple cropping of a rectangular subregion within an entire field of view of the camera. FIG. 1 illustrates a conventional cropping process in which an entire field of view 100 of the camera is used to generate a cropped view 105. Those skilled in the art may refer to such a process as a traditional pan and scan technique in which the cropped view 105 is a rectangle of a particular size centered at a particular point of interest determined from the non-realtime, offline approach. Thus, a smaller video is extracted from a larger video (e.g., creating a 4:3 version from a 16:9 source material)

With an event including highly dynamic objection motions, the offline approach is attractive because complex non-realtime algorithms may be used to plan the trajectory of the virtual (resampling) camera. More importantly, the offline aspect in which realtime images are captured but a non-realtime image is broadcast eliminates the need to accurately anticipate future object motions because the true future motion information is readily available. Similarly, there are no control issues because the virtual camera may move anywhere immediately (because it is has no mass and can move infinitely fast). Despite these advantages, the non-realtime, offline approach has its own drawbacks. Specifically, the resampling includes only a fraction of a resolution of the system in the output image that is broadcast. For example, in a sport like basketball, all players typically occupy only half the court at any given time. Therefore, with a set of fixed cameras which cover the entire court, at least half of the recorded pixels are never used in the output video. In addition, it is impossible to gain high-resolution close-up images as the broadcast image is generated based upon a "zoomed out" realtime image.

Furthermore, the image that is eventually shown in a broadcast using the cropping process of FIG. 1 is the cropped view 105. The cropped view 105 is a sub-area of the entire area comprising the field of view of the camera or from a mosaic of cameras. However, the camera itself is stationary or provides a limited set of angles in which the cropped view 105 may be extracted from the field of view of the camera. Therefore, the cropped view 105 being broadcast may include a skewed or distorted look in the eyes of the viewer. In addition, the cropped view 105 being extracted from the entire field of view 100 may also entail the cropped view 105 being generated by traversing across the entire field of view 100. However, this often results in unintended visual artifacts being introduced such as appearing to a viewer that the camera itself is physically translating.

In order to properly determine the cropped view 105 within the entire field of view 100, conventional systems include autonomous cameras utilizing the above described systems and path planning/control. A conventional autonomous camera system for sports production has employed a common framework in which one or more high-resolution fixed cameras capture the game and features such as player and ball locations are extracted offline. The output broadcast using the cropping approach is then generated afterwards by determining the optimal subregion of the appropriate fixed camera at each time instant. Within conventional autonomous camera systems, there has been significant variety in how the optimal subregion is determined at each time instant. In a first example, one approach augments player features with audience gaze angles. The images of three fixed cameras are stitched together using a cylindrical projection and a rotational off-set based on player and audience gaze features. In a second example, another approach considers three different shot sizes depending on the estimated game situations. A smooth path is achieved using a Schmitt trigger which only puts the camera in motion when the ball nears the edge of the frame. In a third example, a further approach generates a virtual camera trajectory for a basketball using a Markov chain to balance smoothness against deviating from the optimal virtual camera state at each time instant.

In addition to sports, autonomous camera systems have been deployed in lecture halls, video conferences, and television production stages. In these situations, the motion of subjects is quite predictable (possibly scripted and rehearsed) which allows for a range of camera solutions to be employed. In a first example, one approach demonstrates how a user-supervised autonomous camera system automatically frames shots for a cooking show. Various vision algorithms are deployed depending on the type of shot as requested by the human director. In a second example, another approach uses a fixed 1080i camera to record a lecturer. A cropping window is computed from frame differencing and both bilateral filtering and human specified control points for a learned acceleration model smoothes the noisy input signal. In a third example, a further approach controls a virtual camera to record a lecturer. The motion of the virtual camera is regulated using a Kalman filter augmented with a three state rule-based post filtering technique to prefer stationary cameras unless the lecturer is moving significantly. In a fourth example, a still further approach uses a fixed camera to estimate a saliency map of the video conference room to compute an optimal cropping window which balances a loss of information from aperture and resolution effects. Instead of cropping from the wide-angle camera, the desired subregion is used to control a robotic PTZ camera.

With regard to path planning and control, determining where the cameras should look is a key component of any autonomous system. Additionally, the planned trajectory must be smooth such that the process to decide where the camera should look at any given time instant must take into account where the camera should be looking both before and after the current time instant. Camera planning is a relevant issue regarding conventional computer graphics systems. However, computer graphics algorithms rarely consider incomplete and noisy data generated from computer vision and other sensing modalities.

The task of moving a physical camera to keep an object of interest within the field of view is referred to as visual servoing to those skilled in the art. In a first conventional system, a proportion-only feedback control algorithm is employed to adjust the pan-tilt angle of a camera mounted on the end of a human operated boom to keep a target object in the center of the camera image. When multiple targets are tracked, conventional control algorithms often monitor features derived from the point set such as mean and standard deviation. In a second conventional system, a proportion-only control is used to position the centroid of detected image features near the centers of the images of a stereo camera pair. In a third conventional system, a task-priority kinematic control is used to keep a set of interest points within the camera field of view. In such a system, the mean and variance are independent objectives in which pan-tilt values are modified to keep the mean near the center of the image and zoom is regulated to keep the standard deviation within the image boundary.

When applied to generating a video image in a sports environment, conventional systems determine where cameras should look based on player motions. In a first conventional system, a K nearest neighbor classifier is used to learn the relationship between features (such as player position) and the PTZ state of cameras operated by professionals. In a second conventional system, individual players are tracked using a particle filter and a global motion vector field is extrapolated on the ground plane using a Gaussian process regression. Consequently, this system illustrates how convergence regions in the vector field correlate with actual broadcast camera movements.

Both robotics and computer vision have been used to address the issue of planning smooth trajectories for cameras. In a first conventional system, a probabilistic roadmap is used to generate an initial estimate of linear segments which link the current camera state to the desired future camera state. The path is refined by fitting circular arcs between segments to compute a smooth velocity plan which depends on path curvature. In a second conventional system, a video stabilization technique is used to estimate the trajectory of a hand held camera using inter-frame homographies and to identify segments of constant velocity linked together with ease in/out curves. In a third conventional system, a noisy trajectory is refined using a linear program which generates a trajectory preferring constant position or constant velocity segments.

BRIEF DESCRIPTION OF THE DRAWINGS

FIG. 5A shows detected objects according to an exemplary embodiment.

FIG. 5B shows a trace of a centroid according to an exemplary embodiment.

DETAILED DESCRIPTION

Figure 1:
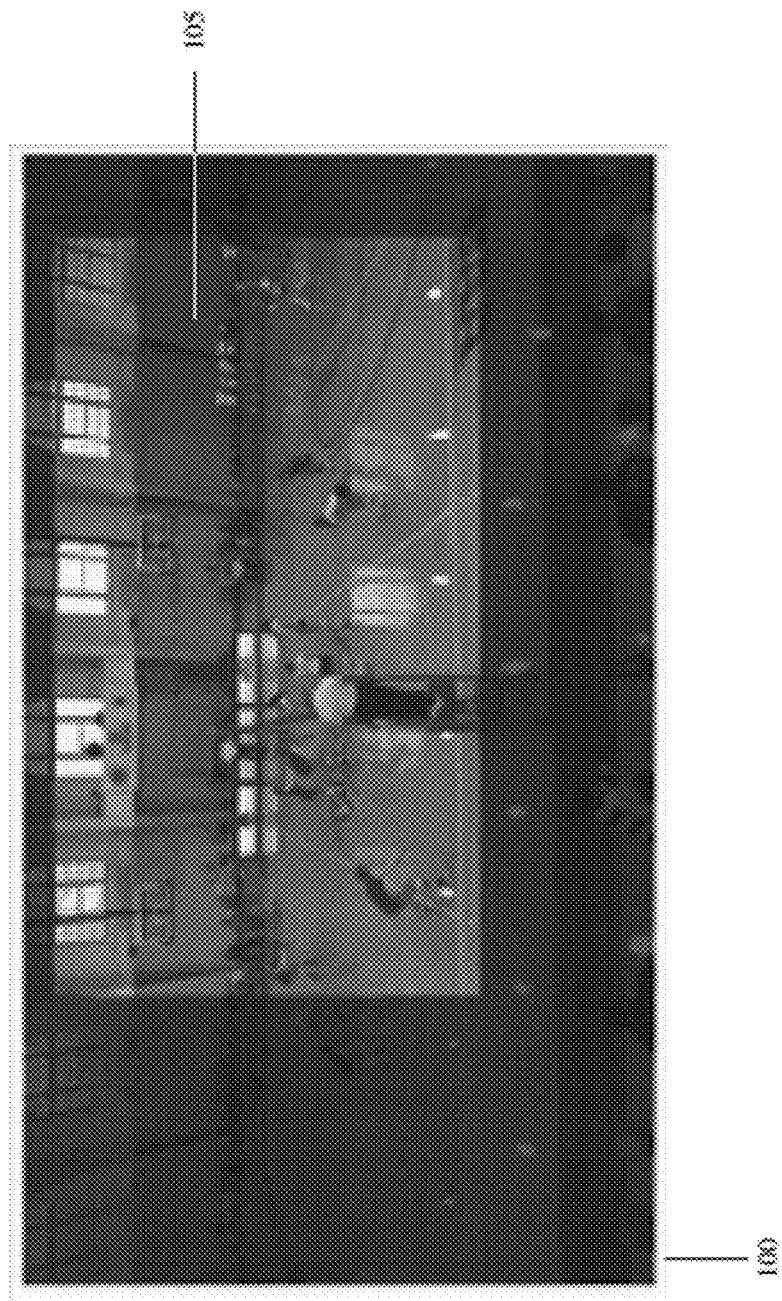
FIG. 1 shows a conventional cropping process for a non-realtime, offline resampling approach.

The present invention relates to a system and method for generating a broadcast image. The method comprises receiving a first image captured by a first camera having a first configuration incorporating a first center of projection; determining a first mapping from a first image plane of the first camera onto a sphere; determining a second mapping from the sphere to a second image plane of a second virtual camera having a second configuration incorporating the first center of projection of the first configuration; and generating a second image based upon the first image and a concatenation of the first and second mappings.

The exemplary embodiments may be further understood with reference to the following description and the appended drawings, wherein like elements are referred to with the same reference numerals. The exemplary embodiments describe a method and device for generating a video image as a function of features of an online, realtime system and an non-realtime, offline system. Specifically, a robotic camera is used to capture a scene such that a virtual camera is capable of resampling the video image following a planned trajectory. The exemplary embodiments further provide a hybrid camera that controls the robotic camera and the virtual camera in a holistic manner. The video image, the systems, the robotic camera, the virtual camera, the hybrid camera, and a related method will be described in further detail below.

The exemplary embodiments provide a hybrid robotic/virtual camera embodied and described below as the "hybrid camera" which balances the strengths and weakness associated with both online, realtime and non-realtime, offline approaches. Specifically, a robotic PTZ camera is equipped with a wide angle lens and tracks sports players in realtime, and the virtual camera resamples the original source video of the robotic PTZ camera in realtime but on a short temporal delay. Accordingly, the hybrid camera remains an online, realtime system with small latency, but gains the non-realtime, offline benefit of perfect knowledge about future events (up to the duration of the temporal delay). As a result, the synthesized video of the virtual camera exhibits minimal loss in image resolution (unlike conventional offline resampling systems) because the robotic camera follows the action. The hybrid camera is a redundantly actuated system which provides certain control issues.

As a hybrid approach utilizing both realtime and non-realtime features, the amount of delay is a critical design factor that regulates the hybrid nature of the system. That is, zero delay produces a completely online system while infinite delay produces a completely offline system. Furthermore, a longer delay improves the ability of the virtual camera to plan an appropriate trajectory because of the knowledge about events further into the future are known. However, the robotic camera must be controlled to ensure the virtual camera remains within the frame boundary so that the resampling process has sufficient information to synthesize the image that would have been captured had the robotic camera looked where the virtual camera is now looking. Unfortunately, the longer the delay being used causes the controlling feedback loop to become more unstable. Therefore, the hybrid camera of the exemplary embodiments has a suitable delay which balances the benefits of improved planning against the drawbacks of more difficult control.

As will be described in further detail below, the hybrid camera deployed for broadcasting a sports event such as a college basketball game improves the ability of the overall system to plan a smooth and purposeful path for the virtual camera using a small delay and a hysteresis filter which is then able to anticipate state changes because of the induced delay. The robotic camera is controlled to follow a live prediction of where the virtual camera is expected to look as well as monitoring where the virtual camera is actually looking. The control stability of the robotic camera decreases as delay increases. Thus, the hybrid camera of the exemplary embodiments is able to produce live footage which more closely resembles the work of a human operator but generates a broadcast video image autonomously.

Figure 2:
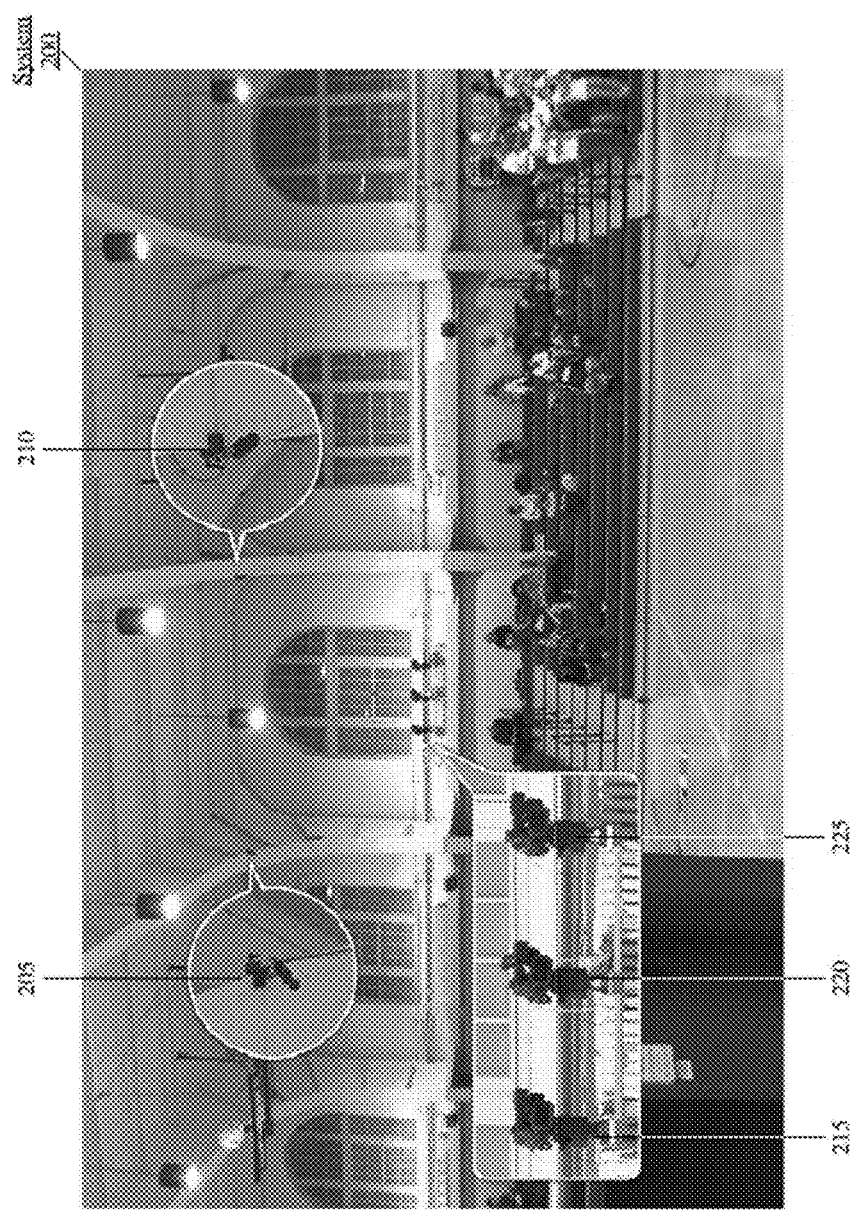
FIG. 2 shows a system of cameras used for resampling according to an exemplary embodiment.

FIG. 2 shows a system 200 of cameras 205-225 used for resampling according to an exemplary embodiment. Specifically, the system 200 includes five (5) total cameras in which cameras 205, 210 are vision cameras used to track players while cameras 215-225 capture broadcast angles of a scene. The cameras 205, 210 may be Allied Vision GX 1920C machine vision cameras mounted in any overhead location of the scene. The cameras 215-225 may be Sony EX3 cameras situated such that the event may be captured. Specifically, as illustrated in FIG. 2, the scene may be for a basketball game in a gymnasium with a roof. The vision cameras 205, 210 may be mounted near the ceiling of the gym to detect and track the basketball players. The broadcast capturing cameras 215-225 may be situated behind the spectator seating near center court to capture the broadcast video. Each camera 205-225 may be mounted on a FLIR D48-E robotic pan-tilt head. Thus, the motion of each camera may be determined from either a human operated joystick or an autonomically generated plan based on realtime analysis of the player positions as generated by the vision cameras 205, 210. It should be noted that the use of two vision cameras 205, 210 and three broadcast capturing cameras 215-225 is only exemplary. The system 200 may utilize any number of cameras such that the data generated by the vision cameras 205, 210 and the data generated by the broadcast capturing cameras 215-225 are produced.

Figures 3A, 3B:
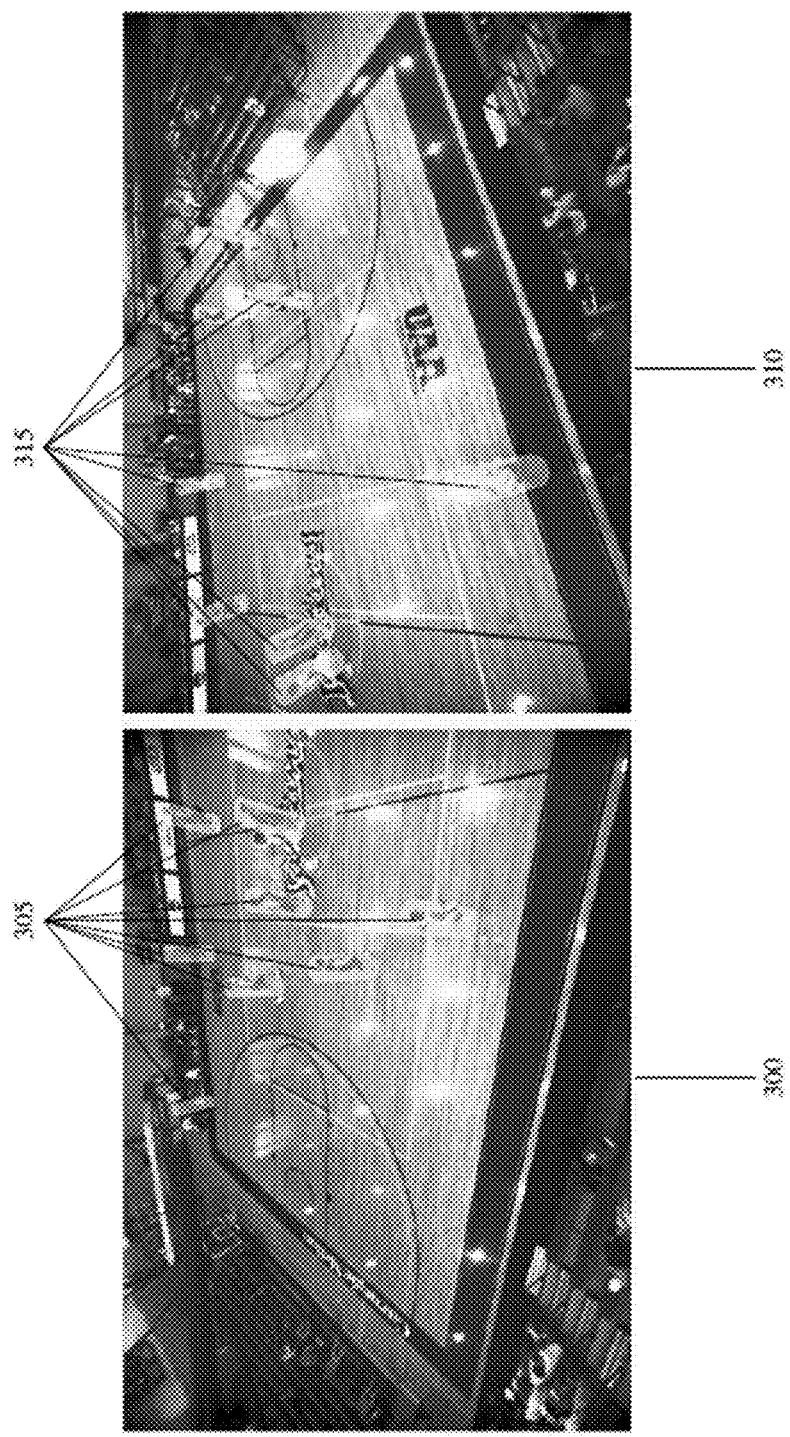
FIGS. 3A-B show tracking of objects using the cameras of the system of FIG. 2 according to an exemplary embodiment.

FIGS. 3A-B show tracking of objects using the cameras 205, 210 of the system 200 of FIG. 2 according to an exemplary embodiment. Specifically, FIG. 3A relates to the vision camera 210 while FIG. 3B relates to the vision camera 205. FIGS. 3A-B illustrate that each machine vision camera 205, 210 monitors just over half of the basketball court. That is, the monitoring is performed such that an entire half of the basketball court is within a field of view of the vision camera 205, 210. Accordingly, FIG. 3A shows a field of view 300 for the vision camera 210 while FIG. 3B shows a field of view 310 for the vision camera 205. FIGS. 3A-B further illustrate the detections of objects, specifically players, within each respective field of vision of the vision cameras 205, 210. Specifically, FIG. 3A shows that objects 305 are detected while FIG. 3B shows that objects 315 are detected. The cameras 205, 210 are calibrated and player positions are detected in realtime (e.g., 25 fps) using any known manner of determining objects or tracking objects over a time period.

It should be noted that the vision cameras 205, 210 detecting the objects may be performed in a variety of manners. In a first example, the vision cameras 205, 210 may include a respective processor such that the objects are detected as discussed above. Thus, the images captured by the cameras 205, 210 are processed by these processors such that video image data and object detection data are generated by the cameras 205, 210. In a second example, the vision cameras 205, 210 may be communicatively connected to a further electronic device for processing of the image data that is captured. Therefore, the vision cameras 205, 210 may generate the video image data and transmit this data to another device. This further device may process the video image data to generate the object detection data. Accordingly, the vision cameras 205, 210 may include an output port when a wired connection is established or may include a wireless transmitter when a wireless connection is established with the further device. In a third example, tracking manners using other forms such as RFID may be utilized to estimate object locations.

Figure 4:
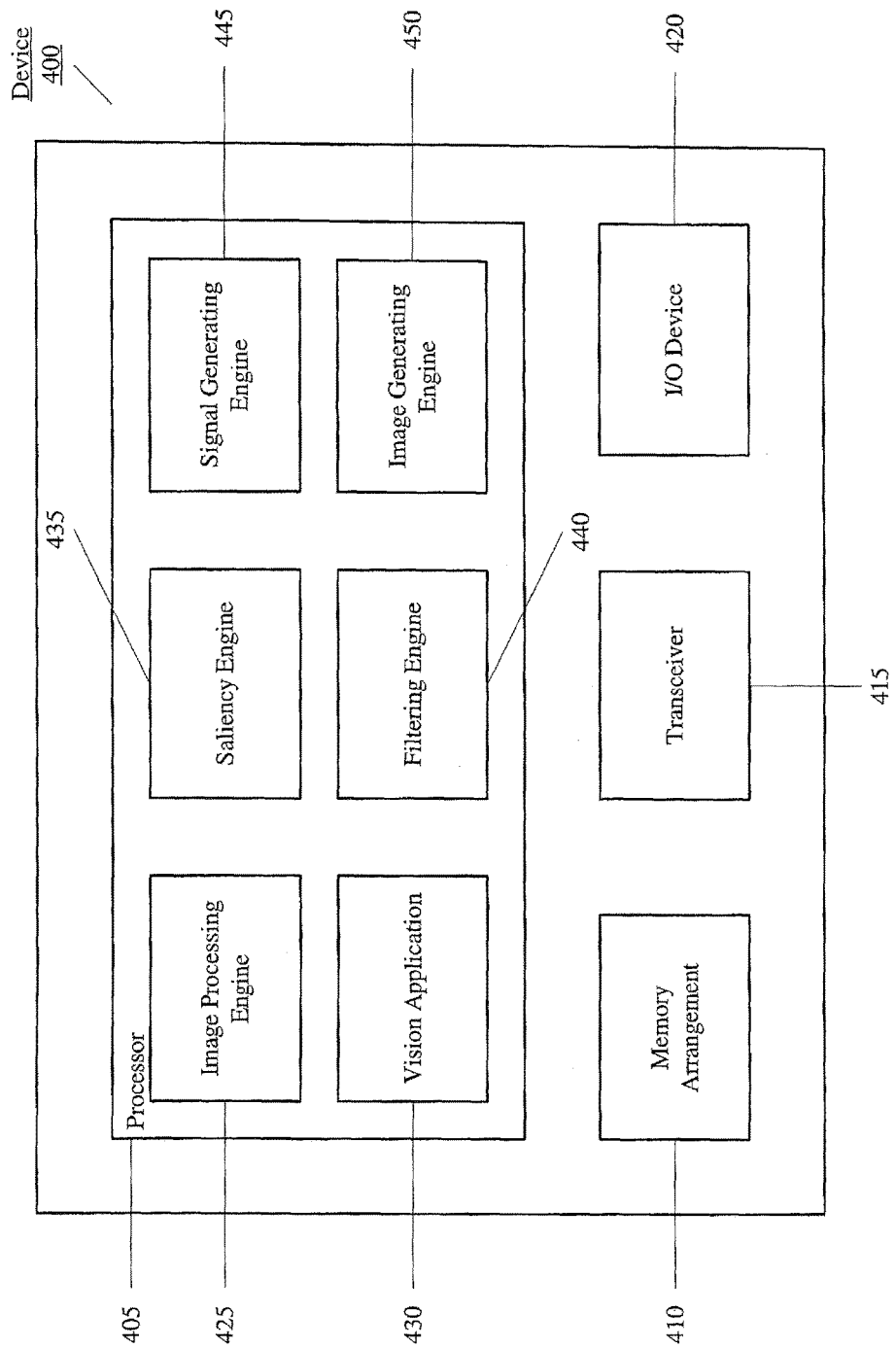
FIG. 4 shows a device for determining a resampling according to an exemplary embodiment.

FIG. 4 shows a device 400 for determining a resampling according to an exemplary embodiment. The device 400 may be any electronic component that is configured to receive and process data such that the resampling is performed. The device 400 may include a processor 405, a memory arrangement 410, a transceiver 415, and an input/output (I/O) device 420. The processor 405 may include a resampling application that is executed. The memory 410 may store data that is received as well as data that is determined. The transceiver 415 and the I/O device 420 may provide a communicative connection to other electronic devices such that data is received for processing. For example, as discussed above, the vision cameras 205, 210 may transmit the video image data to a further electronic device. The further electronic device may be the device 400 or any other device.

The processor 105 may further include a plurality of engines that are configured to perform a functionality associated with determining the resampling. As illustrated, the processor 405 may include an image processing engine 425, a vision application 430, a saliency engine 435, a filtering engine 440, a signal generating engine 445, and an image generating engine 450. The engines will be described in further detail below.

The image processing engine 425 may receive the video image data from the vision cameras 205, 210 as well as the broadcast data from the cameras 215-225. The image processing engine 425 may process the raw data from the cameras 205-225 for subsequent processing by further engines. For example, the vision application 430 may receive the processed video image data of the vision cameras 205, 210 to detect the objects.

Using the data generated by the image processing engine 425 and the data generated by the vision application 430, the device 100 is configured to further process this data such that the resampling video may be generated. According to the exemplary embodiments, a saliency signal that specifies an instantaneous desired pan-tilt position and velocity may be determined and sent to each robotic pan-tilt unit (i.e., the broadcast cameras 215-225). Specifically, the saliency signal may be defined as $s(t)=[\hat{\phi},\hat{\theta},\hat{\dot{\phi}},\hat{\dot{\theta}}]^T$ in which the pan-tilt position is $(\hat{\phi},\hat{\theta})$ and the velocity is $(\hat{\dot{\phi}},\hat{\dot{\theta}})$. The data from the image processing engine 425 and the vision application 430 may be processed by the saliency engine 435 such that the saliency signal is generated by the signal generating engine 445. The saliency engine 435 may process the data such that the saliency signal originates from a human operated joystick or an automatically generated motion plan derived from an analysis of player positioned detected by the vision application 430.

In an exemplary embodiment, the scene for resampling may be for a basketball game. FIG. 5A shows detected objects according to an exemplary embodiment for a basketball game. Specifically, an overhead view 500 illustrates markings of the basketball court in which players 505 are detected and a centroid 510 is also detected. As a basketball game, the centroid 510 may be the basketball. In another example, the centroid 510 may be a location based upon an average of the positions of the players within the playing surface (e.g., player locations on a 2-dimensional grid that is averaged). The centroid 510 may provide an appropriate fixation point for a camera. FIG. 5B shows a trace 515 of the centroid 510 according to an exemplary embodiment. For example, the trace 515 may be a position of the centroid 510 relative to a fixed reference point or relative to the playing surface (e.g., basketball court in a basketball game). The trace 515 of the centroid 510 may be defined as r(t) over a given time period t. The trace 515 also shows the position of the centroid 510 at the instantaneous time of approximately 90 seconds. The broadcast cameras 215-225 utilize the same proportional-only controller to ensure that the cameras 215-225 follow the desired trajectory defined by the saliency signal s(t) as best as possible.

The exemplary embodiments described herein utilize planning and control aspects of each camera's instantaneous pan position and velocity. That is, for simplicity, the changes in tilt are set at a constant tilt angle for the cameras 215-225. Thus, for a scene in a basketball game, only the coordinate of locations along a lengthwise axis X is considered in the description below. Those skilled in the art will understand that changes in tilt are highly unaesthetic. However, those skilled in the art will also understand that the exemplary embodiments may be adapted for changes in tilt angle as well. That is, the description below for the pan position and velocity apply equally well to changes in tilt angle.

The exemplary embodiments provide three different camera configurations. A first camera is operated by a human and represents the target benchmark for automatically controlled cameras. That is, the first camera defines how well an autonomous camera must perform, in order to conclude that it adequately mimics a human operator. A second camera is controlled using traditional visual servoing algorithms. A third camera utilizes the hybrid control algorithm of the exemplary embodiments in which a delayed filtering technique provides the planning algorithm exact knowledge about future events while a virtual camera resamples the image captured by the robotic camera in a previous time period (e.g., a few seconds ago). The description below provides how a path is planned in each of the three cameras and how the planning improves with increased delay. The details of the resampling algorithm are used to synthesize the images of the virtual camera. The pan-tilt motor speeds of the two autonomous cameras are regulated using a proportion-only controller. The visual servoing controller only considers the instantaneous position error of the robotic camera. The hybrid controller balances the errors of both the robotic and virtual cameras.

Figure 6:
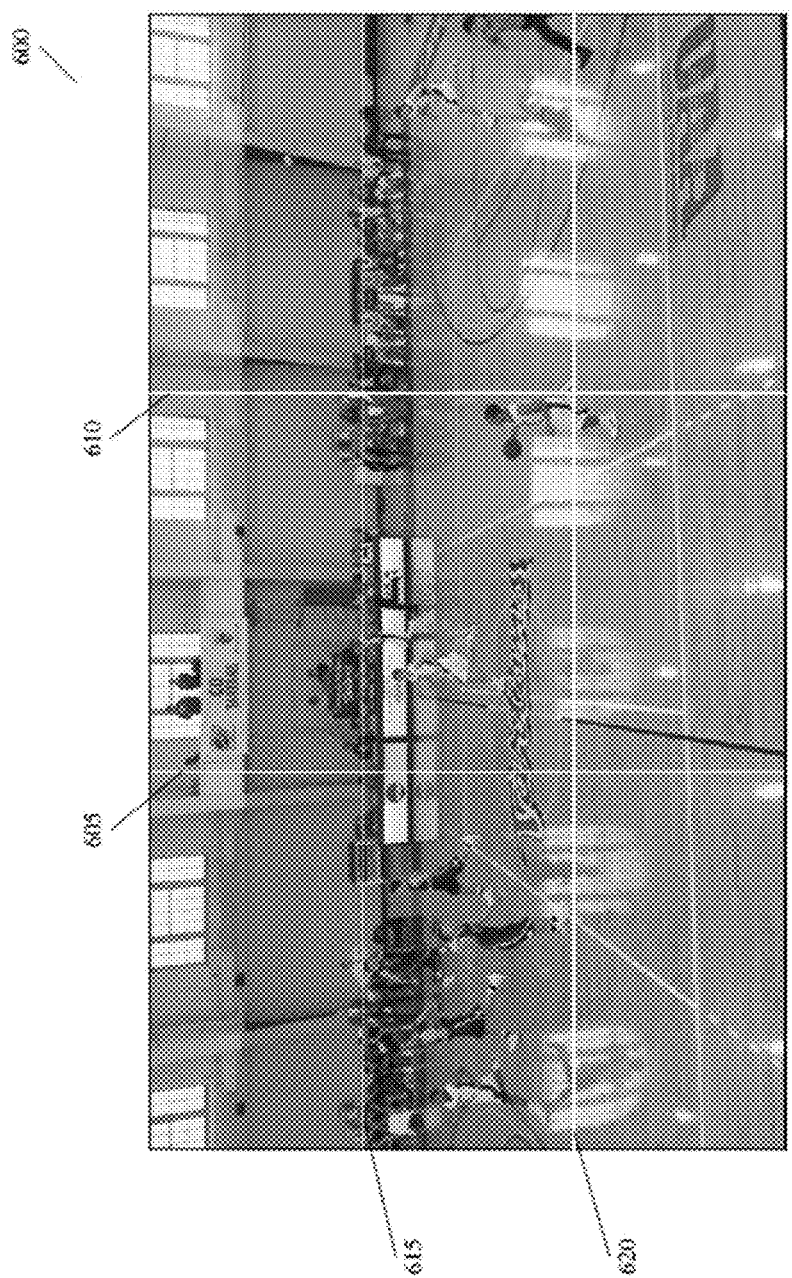
FIG. 6 shows an image division according to an exemplary embodiment.

In a first aspect of the exemplary embodiments, the device 400 generates data via the image processing engine 425 and the vision application 430 such that path planning data is subsequently generated. Path planning data relates to generating the saliency signal s(t) from the detected player positions based upon the data of the vision application 430. This is substantially similar to framing a shot in cinematography. The vision application 430 initially identifies the object(s) of interest such as players, a basketball, and nets in a basketball game. The vision application 430 then utilize rules of shot composition that dictate the manner in which the camera is to operate such that the objects of interest appear in salient regions of the image. For example, FIG. 6 shows an image division according to an exemplary embodiment. Specifically, an overall image 600 utilizes superimposed lines 605-620 such that important objects (e.g., players, basketball, nets, etc.) fall on these lines 605-620 that divide the image 600 into thirds along the length and the width. The image 600 and the lines 605-620 are also generated based upon objects determined to be in motion such that a "lead room" is provided which is indicative of where the object of interest is moving. Those skilled in the art will understand that any trajectory generating application may be utilized to determine the lead room. Accordingly, the image 600 is composed such that the viewer is capable of drawing a correct interpretation in which the image 600 is framed based on the current and anticipated player positions.

It should be noted that perfect autonomous tracking of the players and the ball is not yet possible in either online or offline approaches using known methods of tracking. Therefore, the autonomous understanding of the scene in realtime includes potentially missed players and false detections. Accordingly, the exemplary embodiments utilize assumptions common in visual servoing and approximate the camera fixation point as the centroid $r(t)=[X,\dot{X}]$ of detected player positions.

Within the first aspect of path planning, the exemplary embodiments provide a manner of determining the PTZ projection. The vision application 430 generates a fixation point of the centroid r(t) in the world coordinate system. However, the path planning algorithm must generate a trajectory such that the saliency signal is defined as $$s(t) = \left[\phi, \frac{\dot{\phi}}{dt}\right]^T$$

in each camera's pan-tilt coordinate system. Thus, the following description first provides a manner in which a target location in the world coordinate system is converted into the pan-tilt coordinate system of a PTZ camera before providing how an optimal camera path is extracted from the centroid r(t).

As discussed above, the system 200 includes three (3) broadcast capturing cameras 215-225. A first one 215 of these cameras may be configured for human operation using a joystick while a second one 225 of these cameras may be configured for autonomous operation via visual servoing. A third one 220 of these cameras may be operated using a hybrid robotic/virtual controller. The cameras 215-225 may be mounted on robotic pan/tilt heads with motor speeds regulated using a proportional-integral-derivative (PID) controller. The cameras 215-225 may be calibrated including lens distortion. As will be described in further detail below, the calibration information is used to warp the images in realtime using OpenGL shaders. The first set of shaders undistorts the lens effects in each image and a second set applies projective transforms to generate video from virtual cameras. The parameters of the projective transforms are constantly updated using the latest state estimates from the PID controller.

It should be noted that the use of the three cameras 215-225 is only exemplary. For example, there may only be one physical camera. The system of the exemplary embodiments may be implemented such that the virtual camera and the hybrid camera are processes carried out by the processor 405 based upon captured images from the one physical camera. In another example, there may be a physical camera and a virtual camera in which the hybrid camera is a process that is carried out by the processor 405 based upon the captured images from the physical camera and the images used by the virtual camera.

It should also be noted that the cameras may have a configuration that relates to the calibration parameters thereof such as orientation and zoom. The configuration of the cameras may include intrinsic calibration parameters (e.g., focal length, lens distortion model, principal point, etc.), extrinsic calibration parameters (e.g., position, orientation, etc.), and a combination thereof. As will be described in further detail below, the intrinsic and extrinsic calibration parameters may be utilized in the exemplary manner to generate broadcast images.

A projection matrix of each camera may be estimated using standard point correspondences. That is, the court markings on a gym floor for a basketball court may be used as the calibration pattern. For the three cameras 215, 220, 225 mounted on the robotic pan/tilt heads, an arbitrary pan/tilt position is recorded at which the calibration image is captured. A 3-dimensional rotation is then applied in order to recover the projection matrix associated with the pan/tilt "home" position (e.g., (0,0)). When the cameras are moving (i.e., non-zero velocity vector value), a new projection matrix is computed at each time by applying a 3-dimensional rotation based on the current pan/tilt position to the projection matrix associated with the home pan/tilt position.

In a specific exemplary embodiment, the PTZ cameras are calibrated using point correspondences between the ground plane and image plane by assuming square pixels. A 3×4 projection matrix P maps a homogeneous 3-dimensional world point $X=[X,Y,Z,1]^T$ to a homogeneous 2-dimensional image point $\chi=[u,v,w]^T$ via the transform:

$$\chi = PX \qquad \text{(Equation 1)}$$

The projection matrix factors into matrices representing an intrinsic matrix K which is a 3×3 matrix, a rotation matrix R which is a 3×3 matrix, and position parameters C which is a 3×1 matrix. Thus, the projection matrix P may be defined as:

$$P = KR[I|-C] \qquad \text{(Equation 2)}$$

The intrinsic matrix K contains the focal length f, principal point (u, v), and pixel aspect ratio γ such that:

$$K = \begin{bmatrix} f & 0 & u \\ 0 & \gamma f & v \\ 0 & 0 & 1 \end{bmatrix} \qquad \text{(Equation 3)}$$

The rotation matrices of the three moving cameras 215, 220, 225 change as the robotic pan/tilt heads move. However, the other matrices remain constant for each camera. As a result, the rotation matrix R may be factored into two rotation matrices Q and S with the following:

$$Q(\phi, \theta) = \begin{bmatrix} \cos(\phi) & 0 & -\sin(\phi) \\ -\sin(\phi)\sin(\theta) & \cos(\theta) & -\cos(\phi)\sin(\theta) \\ \sin(\phi)\cos(\theta) & \sin(\theta) & \cos(\phi)\cos(\theta) \end{bmatrix} \qquad \text{(Equation 5)}$$

The rotation matrix S represents the rotational aspects of the transformation from the world coordinate system to the home pan/tilt position and remains fixed. The matrix Q is the 3-dimensional rotation for the current pan/tilt position (φ,θ) relative to the coordinate system of the pan/tilt motor axes and is recomputed at each frame with the following:

$$R \stackrel{def}{=} QS \qquad \text{(Equation 4)}$$

The purpose of the path planning algorithm discussed above is to generate the saliency signal s(t) via the signal generating engine 445 from data generated by the saliency engine 435 defined in each camera's pan/tilt coordinate system based on the sensory data and/or features derived from it, such as the centroid r(t) of player locations. The description below is based upon evaluations in which the centroid of player positions is a reasonable approximation for the true fixation point.

According to the exemplary embodiments, a ground truth oracle saliency signal s*(t) may be specified for the first half of a basketball game by manually identifying key pan positions every second which generate well composed shots or images. For example, a player with the basketball is placed on an appropriate third of the image 600 divided by the lines 605-620 such that the majority of the image shows where the basketball may go next while the amount of visible court area is maximized concurrently.

Figure 7:
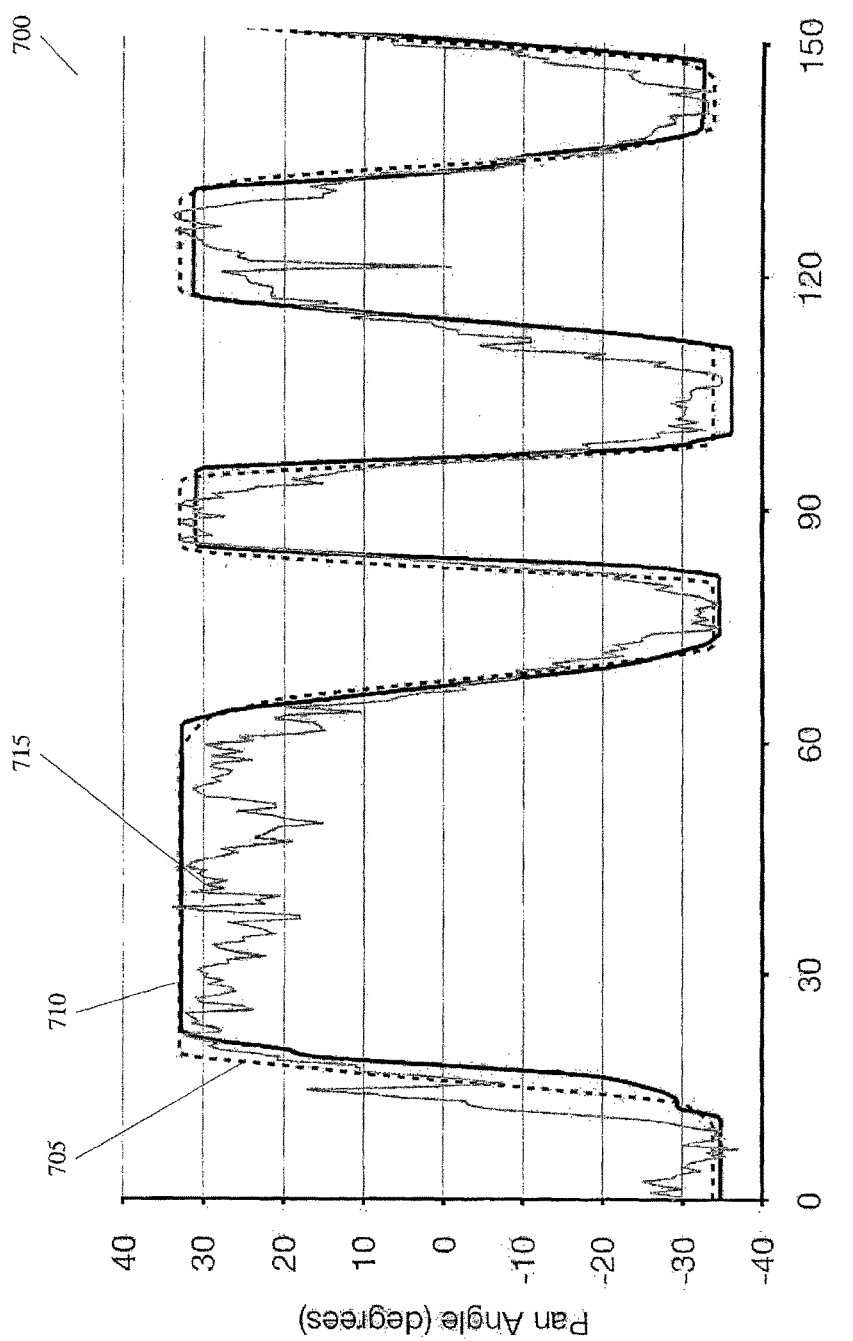
FIG. 7 shows a function of pan angle over time according to an exemplary embodiment.

Over a common period of time of the basketball game, the human operated camera reasonably traces the oracle signal s*(t). FIG. 7 shows a function of pan angle over time according to an exemplary embodiment. Specifically, a graph 700 results from the pan angle over time with regard to the oracle signal s*(t) 705 (dashed line), a human operated joystick 710 (solid line), and a raw player detections centroid 715 (gray line). As illustrated in FIG. 7, the human operated joystick 710 reasonably tracks the oracle signal s*(t) 705 although lags are present on occasion and the optimal pan angle is missed at each end of the court. The player detections centroid 715 also follows the oracle signal s*(t) 705 but has a substantial amount of noise and tends to lead and lag the oracle signal s*(t) more than the human controlled camera. Accordingly, the graph 700 illustrates that the centroid is not a good approximation in certain basketball situations such as fast breaks or slow approaches by the point guard (when the defending team falls back to half court defense). However, it is a reasonably good fixation point a majority of the time outside these extremes.

Those skilled in the art will also understand that online systems require causal filters that only depend on current and previous values. According to the exemplary embodiments, the filtering engine 440 provides a moving average filter to smooth out noise in the pan angles which could cause the camera to look at the centroid of the player positions in a visual servoing context. The filtering engine 440 provides a filter that buffers the pan angles previously computed over the last N seconds and outputs the average of the buffered values. As N increases, the filter signal $s_N(t)$ becomes more smooth but also lags further behind. The filtering engine 440 filters the noisy pan angles for a variety of values of N and computes the discrepancy (with respect to the oracle) in position, velocity and direction changes.

Figure 8:
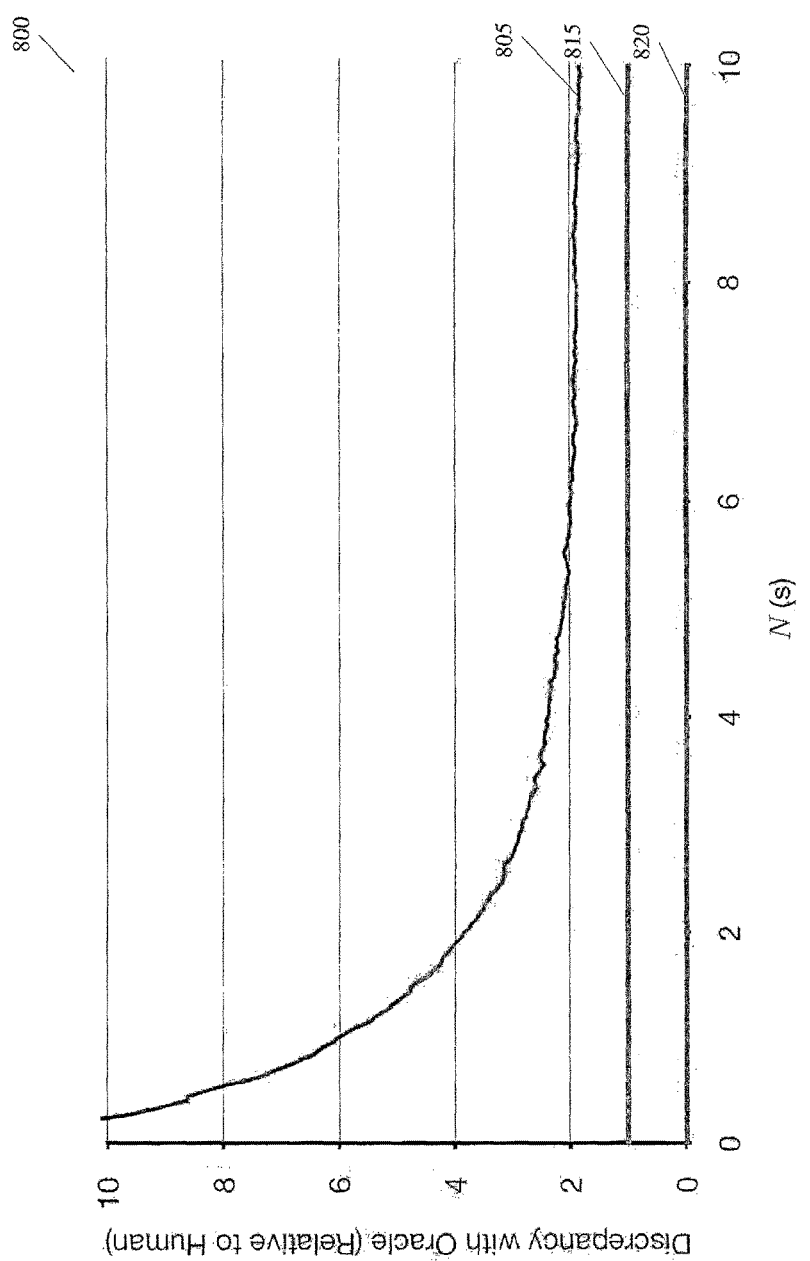
FIG. 8 shows a function of relative position-velocity error over time according to an exemplary embodiment.
Figure 9:
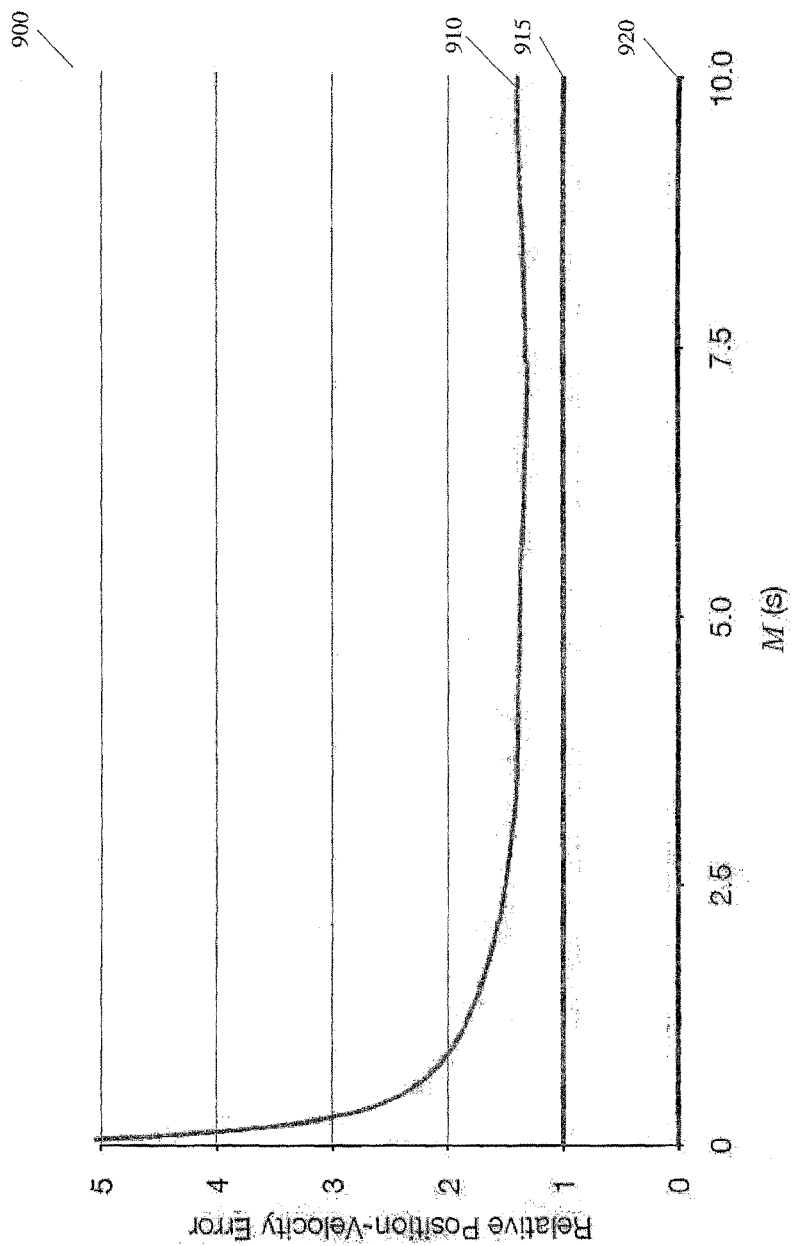
FIG. 9 shows a function of relative position-velocity error over further time according to an exemplary embodiment.

FIG. 8 shows a function of relative performance over time according to an exemplary embodiment. Specifically, a graph 800 shows the performance of a moving average filter 805 plotted relative to the human operated camera 815 and the oracle camera 820. As the buffer of the moving average causal filter is increased, the generated trajectory is more smooth but lags the oracle signal s(t).

The exemplary performance measure treats discrepancies in position, velocity and direction changes as equally important, although the measure may be configured to provide increased importance to specific aspects. Since the units are arbitrary, the discrepancy of the causal filter relative to oracle is normalized relative to the discrepancy of the human operated camera with respect to the oracle.

The filtering engine 440 may further be configured to circumvent the latency induced by a moving average filter by fitting a constant velocity model to the buffered data. Those skilled in the art will understand that a constant velocity model amplifies overshoot if the system is not changing linearly.

Offline and delayed online systems may utilize non-causal filters that consider previous, current, and future values to output a filtered response at the current time. The filtering engine 440 may utilize the buffer size of N=10.0 s into the past and M seconds into the future. The filtering engine 440 approximates the buffered signal as a series of constant velocity segments using L1 trend filtering. The filtered pan positions at the current time and up to a predetermined further time (e.g., four (4) seconds) are examined by a Schmitt trigger to produce a hysteresis effect (in which the camera is kept stationary at either end of the court). If the Schmitt trigger anticipates a change in state, the filtering engine 440 applies a fourth-order polynomial to ease in/out from the current position/velocity to the anticipated position/velocity.

The exemplary embodiments illustrate how as M increases, the non-casual filter is better able to gauge whether the current signal deviation is noise or truly the start of the players moving from one end of the court to the other. Accordingly, the graph 900 shows the performance of the L1 trend 905 non-causal filters being evaluated for different buffer sizes and plotted relative to the human operated camera 915 and the oracle camera 920 in the future time M. The improvement exhibits diminishing returns because distant future events do not significantly impact how a camera should be moved at a current instant. The same error measure used for the causal filter may also be used to determine the optimal delay in a non-causal filter.

Figure 10:
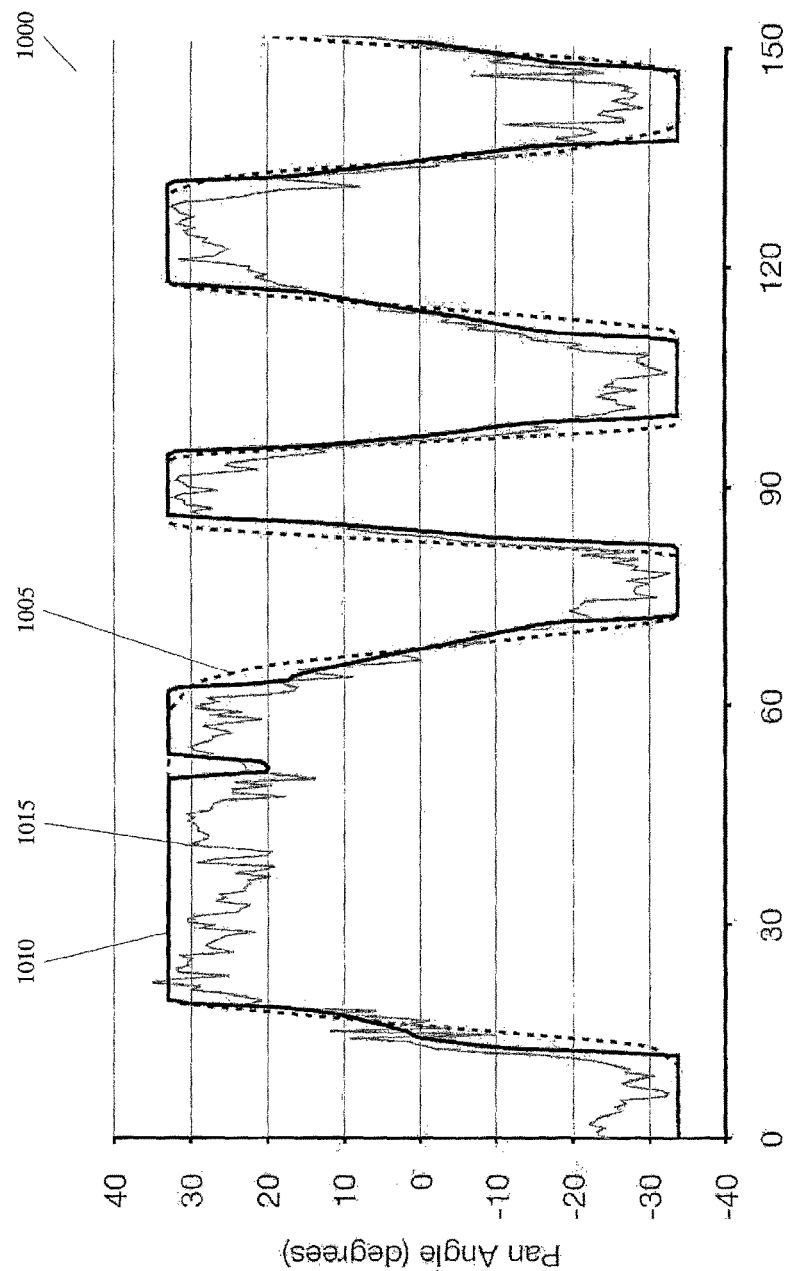
FIG. 10 shows a function of pan angle over time according to an exemplary embodiment.

FIG. 10 shows a function of pan angle over time according to an exemplary embodiment. Specifically, the graph 1000 illustrates a plan for a filtered signal 1010 (solid line) of a virtual camera produced by the non-causal filter for the sample time period discussed above in FIG. 7. For clarity, the filter output is shifted by M* seconds to align temporally with a raw input signal 1015 (gray line) and an oracle signal 1005 (dashed line). The filtered signal 1010 has similar motion characteristics to the oracle signal 1005 but there are occasions where the filtered signal 1010 leads or lags the oracle signal 1005. In these circumstances, the centroid of the player locations is not a good proxy for the true fixation point. Therefore, as will be discussed in further detail below, longer delays become problematic for controlling the hybrid camera.

It should be noted that although the non-causal filter produces a trajectory that is similar to the oracle signal, the filtering process is unable to remove the systematic errors associated with the assumption that the centroid of player positions is an adequate proxy for the correct camera fixation point. That is, the centroid often leads the oracle signal when easing out of a stationary state (e.g., defending team falling back to half court defense). Thus, the exemplary embodiments are configured to overcome these systematic measurement errors by utilizing more complex feature extraction and planning algorithms.

In a second aspect of the exemplary embodiments, the device 400 generates data via the image generating engine 450 such that spherical resampling data is subsequently generated in order to further generate images. As discussed above, the non-causal filter generates a trajectory or saliency signal $s_{N^*,M}(t)$ for the virtual camera operating on a delay of M* seconds. The video of the virtual camera is synthesized from the video of the robotic camera. The virtual camera is operating on a delay of M* seconds and the current time is denoted as t. To generate the current virtual image, the image I(t−M*) captured by the robotic camera M* seconds ago is resampled by the image generating engine 450. At that time, the robotic camera was at a pan position of $\phi_{robotic}(t-M^*)$. The non-causal filter generates a target pan angle of $\hat{\phi}_{virtual}(t)$ for the virtual camera which is similar to both the planned camera position $\hat{\phi}_{robotic}(t-M^*)$ and the actual robotic camera position $\phi_{robotic}(t-M^*)$.

The exemplary embodiments provide a video of the virtual PTZ camera to be synthesized by the image generating engine 450 via a projective warping. In a first exemplary embodiment, the image of a virtual camera may be synthesized from any of the three moving cameras (215, 220, 225) as follows: a sphere centered at C with unit radius may be used such that are each represented by four rays extending from the camera position C and intersecting the surface of the sphere. Each ray may represent the back projection of each image corner. In a second exemplary embodiment, the four rays may be by the back projection of the center of the image (the principal point) and the focal length of the camera. Zoomed in shots have long focal lengths and therefore the intersection area on the surface of the sphere is small. Wide shots have short focal lengths and encompass a large portion of the sphere's area. The above described matrix K contains the focal length information. To map pixels from one camera to another, the image plane is back projected onto the surface of the sphere and a 3-dimensional rotation is applied to move the optical axis from its current position to match the optical axis of the camera to which the projection is performed. Any change in focal length is also accounted between the two cameras by projecting from the sphere to the target camera's image plane. The entire transform is a 3×3 matrix H representing a 2-dimensional perspective transform. Specifically, the mapping from virtual image plane to the robotic image plane is governed by a purely rotational homography using the following:

$$H_{real \to virt} = K_{virtual} R_{virtual} R_{robotic}^{-1} K_{robotic}^{-1} \quad \text{(Equation 6)}$$

Equation 6 may be obtained by substituting $\hat{\phi}_{virtual}(t)$ and $\phi_{robotic}(t-M^*)$ into Equation 5. If the video of the virtual PTZ camera is synthesized by cropping a rectangular subregion from a stationary camera, the resulting video no longer has its optical axis near the center of the image which makes the camera appear as through it is translating left/right on a track or up/down on a pedestal. It should be noted that in practice, those skilled in the art will understand that the inverse homography $H_{virt \to real} = H_{real \to virt}^{-1}$ is used to generate the warped image by resampling the source image at non-integer locations.

Figure 11:
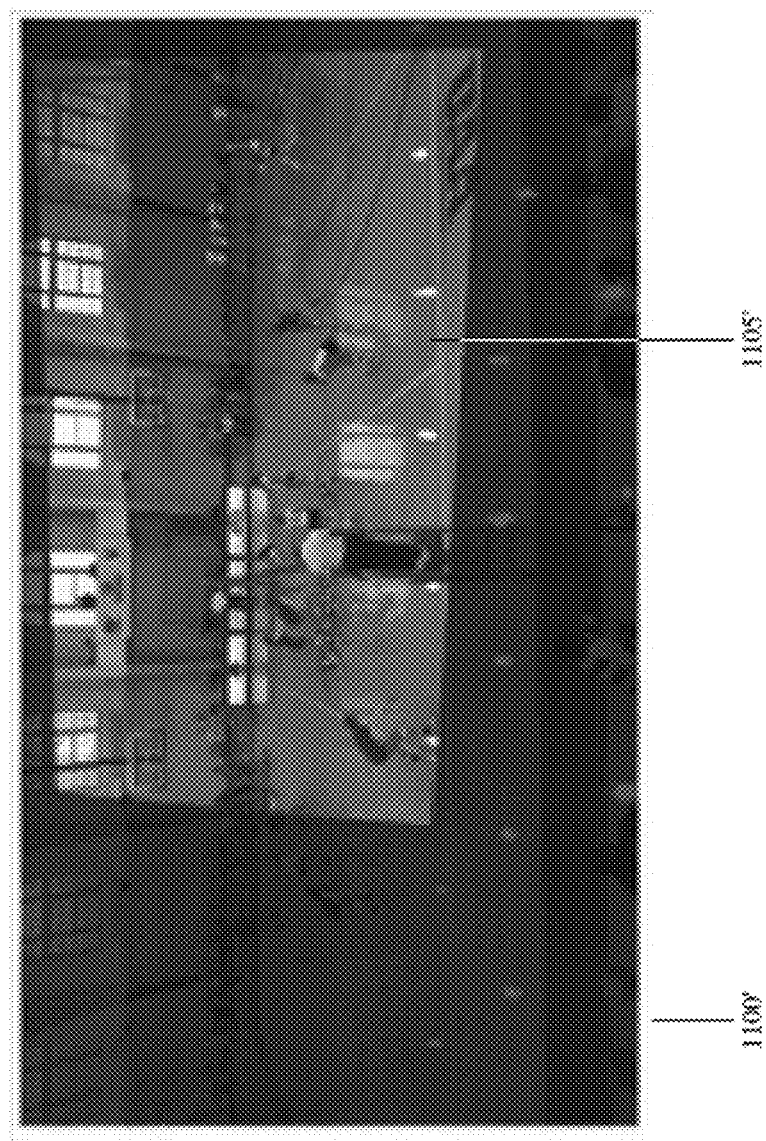
FIG. 11 shows a first spherical resampling according to an exemplary embodiment.
Figure 12A:
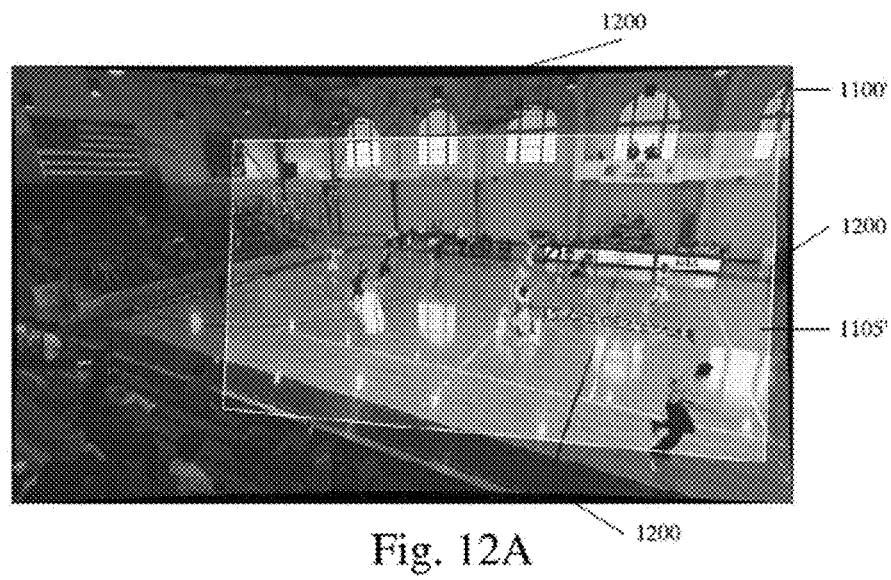
FIG. 12A shows a second spherical resampling according to an exemplary embodiment.
Figure 12B:
FIG. 12B shows an image plane from the second spherical resampling of FIG. 12A according to an exemplary embodiment.

FIG. 11 shows a first spherical resampling for the same fixation point as the cropping rectangle used for the stationary camera in FIG. 1. FIG. 12 shows a second spherical resampling for a moving robotic PTZ camera. It is noted that the compensation for lens distortion effects may create superfluous regions such as dark region 120. The image plane 1105' may be determined in such a way that the dark region 120 is not included within the image plane 1105'. FIG. 12 shows the image plane 1105' from the spherical resampling according to an exemplary embodiment. That is, the image plane 1105' may be a resulting broadcast image that is shown to a viewer after being generated by the image generating engine 450. If there is a large discrepancy between the virtual camera's planned position $\hat{\phi}_{virtual}(t)$ and the actual state $\phi_{robotic}(t-M^*)$ of the robotic camera, it is possible that an image generated through Equation 6 maps all or part of the virtual camera's image beyond the boundary of the robotic camera's image. For example, the image may include the dark region 120. The image generating engine 450 may therefore clamp the planned state of the virtual camera to ensure that the resulting image remains within the field of view of the robotic camera or render the dark region 120 in the virtual camera image. Thus, the image plane 1105' may result as shown in FIG. 12 to remove the dark region 120 if included within the broadcast image of the virtual camera. However, it should be noted that clamping the virtual camera motion may induce jitter into the smooth trajectory. Accordingly, the signal generating engine 445 may generate an appropriate signal based upon the saliency engine 435 and the filtering engine 440 such that the robotic camera is controlled for the virtual camera to avoid the frame boundary or area including the dark region 120.

It should also be noted that the size of the image generated by the image generating engine 450 utilizing Equation 6 remains constant regardless of any change in focal length between the robotic and virtual cameras. However, as the focal length of the virtual camera increases, the number of pixels sampled from the robotic camera decreases, thereby lowering the effective resolution of the virtual camera. Additionally, it may be assumed that there is no significant motion blur in the images captured by the robotic camera and the resampling process does not render blur effects into the synthesized images of the virtual camera based on its virtual motion.

In a third aspect of the exemplary embodiments, the device 400 generates data (specifically a signal) via the signal generating engine 445 such that camera control data is subsequently generated. The above description provides plans for the robotic and virtual cameras. Using this data, the exemplary embodiments determine a manner of operation for the robotic camera such that the virtual camera is able to follow a planned trajectory as the broadcast video that is ultimately generated originates from the virtual camera, not the robotic camera (which provides the raw video data from which the virtual camera resamples). Thus, the description below relates to the control aspects of each camera individually and then the controlling of both cameras in a holistic fashion, namely as the above described hybrid camera.

With regard to control of the robotic camera, each pan-tilt unit (e.g., FLIR unit) may be operated with a control loop (e.g., 30 Hz signal) that receives a current pan-tilt position ($\phi_{robotic}, \theta_{robotic}$) and sets the pan-tilt velocities ($\dot{\phi}_{robotic}, \dot{\theta}_{robotic}$). A conventional visual servoing system utilizes a trajectory $s_{robotic}(t)$ for the robotic camera based upon the causal filter that is regulated based upon a residual function $e_{robotic}(t)$ generated from a desired pan position $\hat{\phi}_{robotic}(t)$ and an actual pan position $\phi_{robotic}(t)$ using the following:

$$e_{robotic}(t) = \hat{\phi}_{robotic}(t) - \phi_{robotic}(t) \quad \text{(Equation 7)}$$

In contrast, the exemplary embodiments utilize a proportion-only feedback with the following:

$$\dot{\phi}_{robotic}(t) = \dot{\hat{\phi}}_{robotic}(t) + \kappa e_{robotic}(t) \quad \text{(Equation 8)}$$

With regard to control of the virtual camera, the virtual camera represents an infinitely fast, massless system which compensates for the deviation between the current planned position generated by the non-causal filter and where the robotic camera was looking M* seconds ago with the following:

$$e_{virtual}(t) \stackrel{def}{=} \hat{\phi}_{virtual}(t) - \phi_{robotic}(t - M^*)$$ (Equation 9)

If the deviation is large, it is possible that the virtual camera moves beyond the boundary of the image captured by the robotic camera M* seconds ago. Thus, as discussed above, the device 400 may compensate for such a scenario. In a first exemplary embodiment, the desired pan position of the virtual camera $\hat{\phi}_{virtual}(t)$ may be modified by restricting a scalar value of the deviation $|e_{virtual}(t)| \leq \Delta\phi$. In a second exemplary embodiment, the zoom of the virtual camera may be increased to remove the portion of the image of the virtual camera that is outside the boundaries of the robotic camera (e.g., edge of image of robotic camera, dark region, etc.). The exemplary embodiments define the focal length of the virtual camera to be equal to that of the robotic camera controlled with visual servoing and equipped with a standard lens. It should be noted that the standard lens provides a simplified side-by-side comparison between the video synthesized by the virtual camera and that captured by a visual servoed robotic camera. However, the robotic camera controlled in a hybrid fashion may utilize other lenses such as a fisheye lens and the exemplary embodiments may be equally applied and adapted for these other types of lenses. In one embodiment, the change in focal length between the virtual hybrid camera and the visually servoed robotic cameras is equivalent to a 1.5× zoom factor applied to the wide angle lens of the hybrid controlled robotic camera. The hybrid controlled robotic camera has a horizontal field of view of approximately 80° while the virtual camera is approximately 60°. As a result, the virtual camera may deviate in its pan position by $\pm\Delta\phi=10°$ before reaching the frame boundary of the robotic camera. If the focal length of the virtual camera is increased, the deviation $\Delta\phi$ would increase as well with exact values determined through Equation 6.

Given the description above, it should be noted that arbitrarily restricting the virtual camera to remain within the image captured by the robotic camera may create an erratic motion path. Ideally, the non-causal filter takes deviation limits into account when planning the trajectory. However, even if a maximum deviation $\Delta\phi$ were enforced in the non-causal filter, the device 400 may not be correcting the error in the robotic camera such that the virtual camera drifts further from the optimal trajectory that is determined. Thus, utilizing the above defined Equation 8, the exemplary embodiments provide a manner to address this issue in which the virtual camera deviates from the center of the captured image, an additional term is incorporated into a controller of the robotic camera's velocity $\theta_{robotic}$ to induce motion which pushes the virtual camera back to the center of the image (or equivalently pulls the robotic camera to follow the plan of the virtual camera).

The following provides additional description for the control of the virtual camera. Because the PTZ camera (e.g., robotic camera) described above does not translate, the current frame may be registered to any previous frame using a 2-dimensional homography. The projection matrix P of the camera into which a source image is warped does not require a real camera. Thus, a video may be generated for a virtual camera by creating a destination projection matrix (e.g., dynamically). In a specific exemplary embodiment with regard to Equation 6 discussed above, the matrices $K_A$ and $R_A$ represent the pan/tilt/zoom state of the physical camera while $K_B$ and $R_B$ indicate the desired pan/tilt/zoom state of the virtual camera. Accordingly, the 3-dimensional rotation for a current pan/tilt position defined by the matrix $Q(\phi,\theta)$ may be defined for the virtual camera. The zoom factor z may modify the focal length properties of the intrinsic matrix K as: $f(z)=f_0/z$, where the value of $f_0$ represents the focal length for the base zoom factor $z=1$.

As discussed above, the warping function defined by Equation 6 may be augmented with functions to account for lens distortion. Thus, it may be necessary to correct for lens distortion in the robotic camera. In addition, it may be aesthetically desirable to add or simulate lens distortion on the virtual camera. For example, wide angle shots may look unnatural in linear perspective due to wide angle lenses typically inducing significant distortion. Therefore, the image generating engine 450 may be configured to add lens distortion when synthesizing an image for a virtual camera with a virtual wide lens.

With regard to the hybrid camera, the robotic and virtual cameras may be controlled in a holistic manner by defining the deviation of the hybrid camera as a linear combination of the robotic camera and virtual camera deviations with the following:

$$e_{hybrid}(t) = e_{robotic}(t) + \gamma e_{virtual}(t)$$ (Equation 10)

The robotic deviation indicates how the robotic camera should move to follow the desired pan position $\hat{\phi}_{robotic}(t)$. The virtual deviation indicates how the robotic camera should move to return the virtual camera to the center of the image. Accordingly, Equation 10 may be represented with the following:

$$e_{hybrid}(t) = \hat{\phi}_{robotic}(t) - \phi_{robotic}(t) + \gamma\hat{\phi}_{virtual}(t) - \gamma\phi_{robotic}(t-M^*)$$ (Equation 11)

Substituting $e_{hybrid}(t)$ for $e_{robotic}(t)$ in Equation 8 results in a proportional feedback control defined with the following:

$$\dot{\phi}_{robotic}(t) = \hat{\phi}_{robotic}(t) + \kappa e_{hybrid}(t)$$ (Equation 12)

Figure 13:
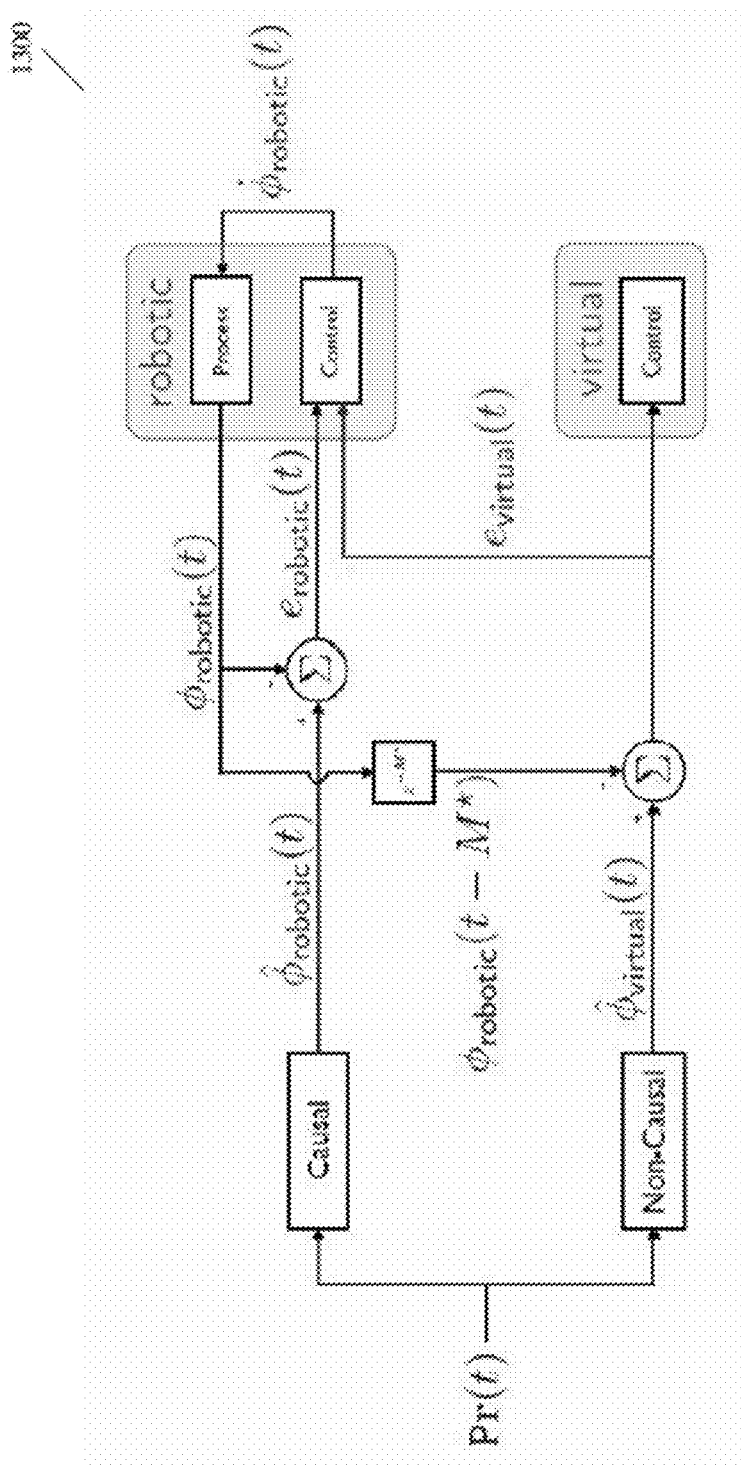
FIG. 13 shows a constructive schematic for the signals controlling the robotic and virtual cameras according to an exemplary embodiment.

Equation 12 balances how well the robotic and virtual cameras follow their plans while encouraging the robotic camera to deviate from its plan to ensure that the virtual camera does not go outside the image boundary. However, Equation 12 introduces a hybrid feedback that includes a delay term $\gamma\phi_{robotic}(t-M^*)$ which decreases the stability of the system. Accordingly, the exemplary embodiments further provide a manner of addressing this delay term $\gamma\phi_{robotic}(t-M^*)$ and its stability for the system. FIG. 13 shows a constructive schematic 1300 for the signals controlling the robotic and virtual cameras according to an exemplary embodiment. Specifically, the delay term $\gamma\phi_{robotic}(t-M^*)$ is shown to be introduced for the control of the virtual camera when the desired pan position of the virtual camera $\hat{\phi}_{virtual}(t)$ is generated through the non-causal filter by the filtering engine 440.

To determine the manner that the delay $\gamma\phi_{robotic}(t-M^*)$ affects the feedback loop, the following description provides analyses in which the image generating engine 450 incorporates the delay. Specifically, the constructive schematic 1400 is referenced herein for the analyses. The constructive schematic 1400 is utilized to implement a hybrid controller which regulates pan-tilt motor speeds such that the robotic and virtual cameras track the pan angles during a basketball game as determined by the causal and non-causal filters of the filtering engine 440. Given the above description, the plans generated by the causal and non-causal filters may deviate significantly. Accordingly, the orientation of the virtual camera relative to the robotic camera may be required to exceed the maximum deviation $\Delta\phi$ that would move the image plane of the virtual camera beyond the frame boundary of the robotic camera. As discussed above, when this occurs, one manner of addressing this issue is to restrict the pan angle of the virtual camera to remain within the image plane of the robotic camera (e.g., ±10°). It should be noted that the description below may assume that both the robotic and virtual cameras are able to track their respective input commands without error.

In a first analysis, a baselines system of cameras that are controlled independently is described. That is, the robotic camera receives no information about where the virtual camera is looking and therefore there is no residual $e_{virtual}(t)$ connection. Accordingly, the constructive schematic 1300 of FIG. 13 may not include the connection from the non-causal filter to the control of the robotic camera. In another manner, the residual connection may be included such as shown in the constructive schematic 1300 of FIG. 13, however, the residual $e_{virtual}(t)$ may be set to zero. In yet another manner, the residual $e_{virtual}(t)$ connection may be included but the signal may not be sent. When considering a first function of pan angle versus time using an independent control according to an exemplary embodiment, a first comparison between a manner in which the robotic camera actually operates, a manner in which the virtual camera actually operates, and a manner in which the virtual camera should operate according to a planned trajectory may be viewed on a first graph. In such a graph, the virtual camera may be restricted to remain within the image plane of the robotic camera. There is no feedback between the virtual camera and the robotic camera (i.e., the signal $e_{virtual}(t)$ is absent, is not sent, or is set to 0 to the robotic controller in the constructive schematic 1300 of FIG. 13). As a result, the position of the virtual camera relative to the robotic camera may fluctuate between ±10°. When the virtual camera hits either of its pan limits, there is a deviation between where the virtual camera is looking and where the non-causal filter had planned for it to look.

In a second analysis, the hybrid controller is tested by introducing the residual $e_{virtual}(t)$ connection as shown in the constructive schematic 1300 of FIG. 13 such that the robotic camera modulates its motion to drive the virtual camera back towards the center of the robotic camera's image. When considering a second function of pan angle versus time using a small delay according to an exemplary embodiment, a second comparison between a manner in which the robotic camera actually operates, a manner in which the hybrid camera actually operates, and a manner in which the hybrid camera should operate according to a planned trajectory may be viewed in a second graph. In such a graph, a short delay of M*=1.0 s may be incorporated such that the relative position of the virtual camera is incorporated into the robotic camera's control algorithm. As the virtual camera moves away from the center of the robotic camera's image, the robotic controller adjusts the robotic camera's speed to drive the virtual camera back to the image center. The resulting path of the hybrid camera more closely follows its plan.

In a third analysis, the hybrid controller is tested by introducing the residual $e_{virtual}(t)$ connection as shown in the constructive schematic 1300 of FIG. 13 such that the robotic camera modulates its motion to drive the virtual camera back towards the center of the robotic camera's image. However, in this analysis, a delay that is substantially larger is used. When considering a third function of pan angle versus time using a large delay according to an exemplary embodiment, a third comparison between a manner in which the robotic camera actually operates, a manner in which the hybrid camera actually operates, and a manner in which the hybrid camera should operate according to a planned trajectory may be viewed in a third graph. When $\kappa$=0.75 and M=2.0 s, the adverse effects of incorporating too much gain and delay in the feedback signal may be seen. The robotic camera oscillates around its target trajectory, and the virtual camera oscillates from one frame boundary to the other.

As discussed above, increasing values of delay M may improve the prediction performance of the non-causal filter versus the ideal case as determined by an oracle. However, increasing the values of delay M beyond a predetermined maximum may consequently deteriorate control performance of the hybrid camera.

Figure 14:
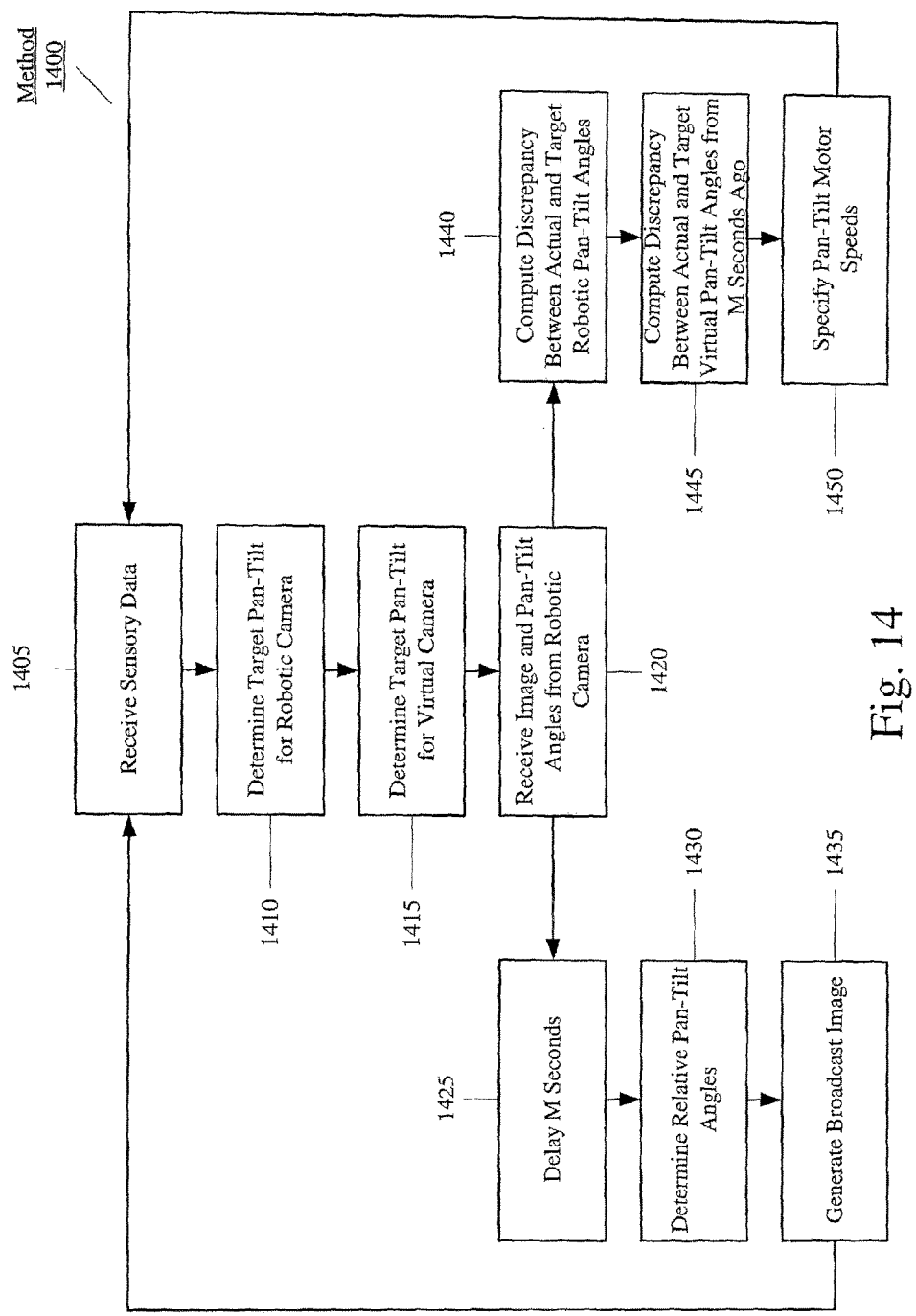
FIG. 14 shows a method of generating a broadcast image as well as specifying motor speeds according to an exemplary embodiment.

FIG. 14 shows a method 1400 of generating a broadcast image as well as specifying motor speeds according to an exemplary embodiment. The method 1400 relates to a manner in which a broadcast image is generated based upon a robotic camera and a virtual camera. The method 1400 also relates to a manner in which a motor speed of the camera is generated. The method 1400 further relates to the virtual camera operating as a hybrid camera such that a realtime, online approach is utilized in which a delay is introduced to generate the broadcast image and determine the motor speed. The method 1400 will be described with reference to the device 400 of FIG. 4.

In step 1405, the device 400 receives sensory data. For example, the sensory data may include the set of detected player locations from the machine vision cameras (e.g., the robotic camera 215 of the system 200 of FIG. 2). In this embodiment, the players may represent the objects to be tracked. Using a complex filter or other component that is configured with a substantially similar functionality, the raw information that is provided as the sensory data may be used to determine fixation points for both the robotic and virtual cameras. The robotic camera may be configured with a field of view such that the virtual camera occupies at least a portion of the field of view. The image processing engine 425 may receive an image plane of the robotic camera. As discussed above, the image processing engine 425 may receive raw image data generated by the camera 215 for subsequent processing thereby such as determining the set of detected player locations relative to the image plane.

When receiving the raw image data, the device 400 may determine objects to be tracked within the image plane of the robotic camera. Specifically, the vision application 430 may receive the processed image plane of the robotic camera from the image processing engine 425 in order to determine the objects to be tracked. However, as discussed above, the cameras may be configured to generate this data and simply provide this data to the device 400. The vision application 430 may determine the objects to be tracked using any manner of tracking or detecting algorithm such as that shown in FIGS. 3A-B. Thus, in a basketball game, the vision application 430 may determine that the objects to be tracked include players, a basketball, and nets.

In step 1410, the device 400 determines a target pan-tilt angle for the robotic camera using the causal filter. That is, the device 400 determines where the robotic camera should look at a particular time. Specifically, the filtering engine 440 determines the causal filter for the camera 215 of the system 200 of FIG. 2. The causal filter may rely upon current and previous tracking values of the determined objects. The causal filter provides a manner of utilizing a moving average filter to smooth out noise in the pan angles of the robotic camera that may cause the camera to look at the player positions (or a centroid).

In step 1415, the device 400 determines a target pan-tilt angle for the virtual camera using the non-causal filter. That is, the device 400 determines where the virtual camera should have looked at a time M seconds ago relative to the time the robotic camera should have looked as used in step 1410. Specifically, the filtering engine 440 determines the non-causal filter for the camera 225 of the system 200 of FIG. 2. The non-causal filter may rely upon previous, current, and future values to output a filtered response at a current time. That is, a delay value is introduced for the non-causal filter such that an offline or delayed online system approach is utilized.

In step 1420, the device 400 receives the image and pan-tilt angles from the robotic camera. That is, the current image from the robotic camera as well as where it is looking is received. Once the image and pan-tilt angles from the robotic camera are received, the device 400 may compute further aspects. Specifically, in a first aspect, the device 400 may generate the broadcast image. By delaying the video, an image may become available for a spherical resampling once the location where the virtual camera is to look is determined (which can only be computed after a M second delay). In a second aspect, the device 400 may determine pan-tilt motor speeds for the cameras. The speed may relate to a discrepancy between where it is currently looking and where it should be currently looking. Each aspect will be described in further detail below.

In the first aspect, the device 400 generates the broadcast image. As illustrated in the method 1400 of FIG. 14, the method 1400 may continue to step 1425 for this feature. In step 1425, the device 400 is delayed by M seconds. During this step, the image received from the robotic camera may be pushed into a video buffer such that an oldest image (captured earliest) is used. In step 1430, the relative pan-tilt angles of the virtual camera restricted to the robotic image plane is determined. As discussed above, the non-causal filter may output where the virtual camera should have been looking M seconds ago such that this target relative to where the robotic camera was actually looking M seconds ago may be expressed. Thus, in step 1435, the broadcast image may be generated using the relative pan-tilt angles in which the captured video frame is resampled (using spherical resampling) from M seconds ago. The method 1400 may return to step 1405 such that a following broadcast image may be generated. That is, these steps may be repeated such that a concatenation of the broadcast images generates a broadcast video.

In the second aspect, the device 400 determines the pan-tilt motor speeds for the cameras. Returning to step 1420, once the image and pan-tilt angles form the robotic camera are received, the method 1400 continues to step 1440. In step 1440, a discrepancy between an actual and target robotic pan-tilt angle is determined. That is, the difference between where the robotic camera is currently actually looking and where it should be looking (as determined by the output of the causal filter) is determined. In step 1445, a discrepancy between an actual and target virtual pan-tilt angle from M seconds ago is determined. That is, the difference between where the virtual camera is actually looking (on a video frame captured M seconds go) and where it should have been looking (based on the output of the non-causal filter) is determined. In step 1450, the pan-tilt motor speeds may be specified from these discrepancies. That is, new speeds for the pan-tilt motors of the robotic camera may be determined so that the robotic camera follows its planned path and the virtual camera stays close to the center of the robotic camera's image. The method 1400 may return to step 1405 such that the pan-tilt motor speeds may be adjusted accordingly based upon updated sensory data.

It should be noted that the steps of the method 1400 described above is only exemplary. Those skilled in the art will understand that various steps of the method 1400 may be performed at various times or concurrently. For example, the steps of generating the broadcast image and the steps of specifying the pan-tilt motor speeds may be performed concurrently once the image and pan-tilt angles of the robotic camera are received.

The exemplary embodiments provide a method and device for generating a broadcast image from resampling an image plane of a robotic camera with an image plane of a virtual camera. The robotic and virtual cameras are controlled in a holistic fashion such that a hybrid camera is defined. The hybrid camera provides a balance between the features of an online, realtime system and a non-realtime, offline system such that a delay is incorporated in generating the image plane of the virtual camera. By determining an optimal delay time value to be utilized in the generating of the image plane of the virtual camera, an actual trajectory of the virtual camera within the image plane of the robotic camera may follow a predetermined planned trajectory.

Autonomous camera systems have traditionally been implemented with either robotic cameras or virtual cameras resampled from fixed cameras. The offline resampling process generates smooth aesthetic trajectories because the algorithm has full information about all future events. However, because the physical cameras do not move, the resolution of the system is limited. In addition, it is impossible to broadcast a live event. Robotic cameras generate plans in realtime with no information about future events. Aesthetics aspects are often neglected because it is extremely difficult to track and accurately anticipate object motions in realtime with zero latency. Therefore, the exemplary embodiments provide the hybrid camera which operates a virtual camera on a delay (to plan smooth purposeful motion based on immediate future events) and controls a robotic camera to follow the live action (which maximizes the resolution of the synthesized broadcast video). The exemplary embodiments further determine the delay necessary for the device and method to generate the synthesized broadcast video. Specifically, little to no delay provides no data regarding future events while a longer delay makes robotic control more difficult.

The device and method of the exemplary embodiments utilize a hysteresis to generate purposeful camera motion as it is better to maintain the camera's current trajectory than to deviate slightly for small shot composition improvements. That is, the minor deviations in a visual servoing may cause the broadcast image to potentially fluctuate wildly. Incorporating hysteresis into a zero latency system is difficult because switching from one state to another may generate a discontinuity in the planned signal or introduce temporary latency as the system transitions between states. However, by operating the virtual camera on a delay, the non-causal hysteresis filter of the exemplary embodiments are capable of anticipating state changes based on future information.

If the operating delay is sufficiently short, controlling the robotic camera to keep the virtual camera within its field of view is advantageous. However, if the delay becomes too large, the system may become unstable. In this situation, the exemplary embodiments provide for the robotic camera to be controlled in a traditional visual servoing manner with no delayed feedback while the video is still resampled with a virtual camera operating on a delay. It is noted that the exemplary embodiments are described with respect to autonomous cameras but may also equally apply to robotic cameras with remote human operators.

Furthermore, the exemplary embodiments provide for the use of spherical resampling to resample video captured by a robotic camera to synthesize video of a virtual camera. Spherical resampling may be used in a variety of applications. In a first example, there are many scenarios where a large area is monitored by a stationary camera equipped with a wide angle lens or a panorama stitched from multiple cameras. Typically, only a portion of the wide angle image contains objects of interest. The same problem arises in format conversion where the pan and scan crops a rectangle of specified aspect ratio at a particular location. However, by computing the equivalent pan and tilt angles to move the camera's optical axis to the particular location of interest, the spherical resampling resembles a camera panning left/right to follow an object whereas the pan and scan approach creates a visual effect as though the camera is translating. In a second example, at each frame, a desired state for the pan/tilt head is computed that defines a desired motion path for the system of cameras. The discrepancy between the actual pan-tilt and desired pan-tilt drives the control loop. However, when displaying the current frame, spherical resampling may be used to warp the image captured at the actual pan-tilt into the image that would have been captured at the desired pan-tilt. As a result, there is effectively zero delay between sending and executing commands for the pan/tilt head and the visual feedback of the robotic camera's image. In a third example, good camera control requires accurate anticipation. Camera operators must give moving objects appropriate "lead room" while maintaining smooth motion trajectories. In some situations, it may be difficult to accurately anticipate future object motions. Using a wide angle lens to track the object of interest reasonably well, a virtual camera operating on an induced delay may generate the appropriate ease in/out motions since the future locations of the object are known. A higher zoom factor gives the virtual camera more freedom to deviate from the physical camera's path but decreases the resolution of the output video. A longer delay gives the virtual camera more lead time but creates a virtual camera path that deviates significantly from the path taken by the robotic camera. The hybrid controller addresses these concerns through finding a balance for maximum virtual image resolution and aesthetic camera operation.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   receiving a first image captured by a first camera having a first configuration including a first optical axis;
   determining a first mapping from a first image plane of the first camera onto a sphere, wherein the sphere is centered at the first camera;
   determining a second mapping from the sphere to a second image plane of a second virtual camera having a second configuration; and
   generating a second image based on a resampling of the first image, the second mapping from the sphere to the second image plane and applying a three-dimensional rotation to the first optical axis to generate a second optical axis that corresponds to the second image plane.

2. The method of claim 1, wherein the first camera remains stationary, and the first configuration is fixed.

3. The method of claim 1, wherein the first camera is a Pan-Tilt-Zoom (PTZ) camera, and the first configuration is determined by an internal state of the PTZ camera.

4. The method of claim 3, wherein the PTZ camera is steered by a control loop based on a discrepancy between a desired first configuration and an actual first configuration.

5. The method of claim 4, wherein at least one of the desired first configuration and a desired second configuration is determined by an analysis of sensor data.

6. The method of claim 5, wherein the at least one of the desired first configuration and the desired second configuration is determined by a human operator.

7. The method of claim 1, wherein the determination of the second configuration is delayed relative to the determination of the first configuration.

8. The method of claim 1, wherein the second configuration is restricted from deviating from the first configuration beyond a predetermined value.

9. The method of claim 4, wherein the control loop is based on a discrepancy between a desired first configuration, an actual first configuration, a desired second configuration, and an actual second configuration.

10. The method of claim 9, wherein the desired second configuration and actual second configuration are delayed relative to the desired first configuration and actual first configuration.

11. A device, comprising:
    a processor coupled to a memory, wherein the processor is programmed to generate a broadcast image by:
    receiving a first image captured by a first camera having a first configuration including a first optical axis;
    determining a first mapping from a first image plane of the first camera onto a sphere, wherein the sphere is centered at the first camera;
    determining a second mapping from the sphere to a second image plane of a second virtual camera having a second configuration; and
    generating a second image based on a resampling of the first image, the second mapping from the sphere to the second image plane and applying a three-dimensional rotation to the first optical axis to generate a second optical axis that corresponds to the second image plane.

12. The device of claim 11, wherein the first camera remains stationary, and the first configuration is fixed.

13. The device of claim 11, wherein the first camera is a Pan-Tilt-Zoom (PTZ) camera, and the first configuration is determined by an internal state of the PTZ camera.

14. The device of claim 13, wherein the PTZ camera is steered by a control loop based on a discrepancy between a desired first configuration and an actual first configuration.

15. The device of claim 14, wherein at least one of the desired first configuration and a desired second configuration is determined by an analysis of sensor data.

16. The device of claim 15, wherein the at least one of the desired first configuration and the desired second configuration is determined by a human operator.

17. The device of claim 11, wherein the determination of the second configuration is delayed relative to the determination of the first configuration.

18. The device of claim 11, wherein the second configuration is restricted from deviating from the first configuration beyond a predetermined value.

19. The device of claim 14, wherein the control loop is based on a discrepancy between a desired first configuration, an actual first configuration, a desired second configuration, and an actual second configuration.

20. A non-transitory computer readable storage medium including a set of instructions executable by a processor, the set of instructions operable to:

receive a first image captured by a first camera having a first configuration including a first optical axis;

determine a first mapping from a first image plane of the first camera onto a sphere, wherein the sphere is centered at the first camera;

determine a second mapping from the sphere to a second image plane of a second virtual camera having a second configuration; and generate a second image based on a resampling of the first image, the second mapping from the sphere to the second image plane and applying a three-dimensional rotation to the first optical axis to generate a second optical axis that corresponds to the second image plane.

* * * * *